(12) United States Patent
Ohba et al.

(10) Patent No.: US 7,295,699 B2
(45) Date of Patent: Nov. 13, 2007

(54) IMAGE PROCESSING SYSTEM, PROGRAM, INFORMATION STORAGE MEDIUM, AND IMAGE PROCESSING METHOD

(75) Inventors: Yasuo Ohba, Yokohama (JP); Kentaro Yamaguchi, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 765 days.

(21) Appl. No.: 10/847,447

(22) Filed: May 18, 2004

(65) Prior Publication Data

US 2005/0036673 A1   Feb. 17, 2005

(30) Foreign Application Priority Data

May 20, 2003   (JP)   ............... 2003-142337

(51) Int. Cl.
 G06K 9/00   (2006.01)
 G06K 9/36   (2006.01)
(52) U.S. Cl. .............. 382/154; 382/285; 345/419; 356/12; 348/42; 359/462
(58) Field of Classification Search ........ 382/154, 382/285; 345/419–427; 356/12–14; 348/42–60; 359/462–477; 352/57–65; 33/20.4; 353/7–9; 378/41–42; 396/324–331
 See application file for complete search history.

(56) References Cited

U.S. PATENT DOCUMENTS

| | | | |
|---|---|---|---|
| 5,553,208 A | 9/1996 | Murata et al. | |
| 5,561,746 A | 10/1996 | Murata et al. | |
| 5,615,322 A | 3/1997 | Murata et al. | |
| 5,621,867 A | 4/1997 | Murata et al. | |
| 5,870,101 A | 2/1999 | Murata et al. | |
| 5,990,900 A | * 11/1999 | Seago | ............. 345/427 |

(Continued)

FOREIGN PATENT DOCUMENTS

JP   A 3-030071   2/1991

(Continued)

OTHER PUBLICATIONS

U.S. Appl. No. 10/705,464, filed Nov. 12, 2003, Tooyama et al.

(Continued)

*Primary Examiner*—Aaron W Carter
(74) *Attorney, Agent, or Firm*—Oliff & Berridge, PLC

(57) ABSTRACT

An original image area IMR is divided into divided image areas DR1 to DR4, texture coordinates specified by division point coordinates are obtained, and images of the divided image areas DR1 to DR4 are mapped onto polygons PL1 to PL4, based on the obtained texture coordinates. The original image area IMR is divided in such a manner that division spacing in a direction DIR1 towards a vanishing point VP1 from the original image becomes narrower as the divided image areas are closer to the vanishing point VP1 and texture coordinates are obtained, to implement correction processing for removing perspective of the original image. Correction processing is performed to remove perspective of images at a base surface of images IL1 and IR1 for the left eye and the right eye, the images IL2 and IR2 for the left eye and the right eye are generated, and a stereoscopic image is generated by synthesizing (by anaglyph processing) IL2 and IR2.

17 Claims, 27 Drawing Sheets

U.S. PATENT DOCUMENTS

| | | |
|---|---|---|
| 6,333,747 B1 | 12/2001 | Murata et al. |
| 6,351,262 B1 * | 2/2002 | Edmark ...................... 345/427 |
| 6,504,535 B1 * | 1/2003 | Edmark ...................... 345/419 |
| 6,556,195 B1 * | 4/2003 | Totsuka et al. ............. 345/419 |
| 6,700,578 B2 * | 3/2004 | Kamata et al. ............. 345/473 |
| 6,801,654 B2 | 10/2004 | Nakamura et al. |
| 6,963,365 B2 | 11/2005 | Baron |
| 2001/0051001 A1 | 12/2001 | Nakamura et al. |
| 2001/0052935 A1 | 12/2001 | Yano |
| 2002/0118292 A1 | 8/2002 | Baron |

FOREIGN PATENT DOCUMENTS

| | | |
|---|---|---|
| JP | A 03-198167 | 8/1991 |
| JP | A 04-165473 | 6/1992 |
| JP | A 6-266852 | 9/1994 |
| JP | A 06-274650 | 9/1994 |
| JP | A 07-271952 | 10/1995 |
| JP | A 2000-056411 | 2/2000 |
| JP | A 2000-293627 | 10/2000 |
| JP | A 2001-266176 | 9/2001 |
| JP | A 2001-346226 | 12/2001 |
| JP | A 2002-057879 | 2/2002 |
| JP | A 2002-325200 | 11/2002 |
| JP | A 2002-335438 | 11/2002 |

OTHER PUBLICATIONS

U.S. Appl. No. 10/704,970, filed Nov. 12, 2003, Tooyama et al.

* cited by examiner

STEREOSCOPIC IMAGE (ANAGLYPH IMAGE)

//IMAGE PROCESSING SYSTEM, PROGRAM, INFORMATION STORAGE MEDIUM, AND IMAGE PROCESSING METHOD

Japanese Patent Application No. 2003-142337, filed on May 20, 2003, is hereby incorporated by reference in its entirety.

BACKGROUND OF THE INVENTION

The present invention relates to an image processing system, a program, an information storage medium, and an image processing method.

A technique is known in the art of preparing an image for the left eye, taken by a camera that is equivalent to the left eye, and an image for the right eye, taken by a camera that is equivalent to the right eye, then synthesizing these images by anaglyph processing or the like to obtain a stereoscopic image (printed material for stereoscopic viewing), as disclosed in Japanese Patent Application Laid-Open No. 2000-56411, by way of example.

There are three physiological functions that enable a human being to experience the feeling of three dimensions: (1) binocular parallax (difference in the line-of-sight angles of the eyes) that creates an offset in the imaging of the retinas due to the spatial separation of the left and right eyes, (2) convergence, which is a function that directs the eyes inward, and (3) focal adjustment (focal distance) of the thickness of a crystal body in answer to distance to the object. The human being processes the three physiological functions of binocular parallax, convergence, and focal adjustment within the brain, to produce the stereoscopic feeling.

The relationships between these three physiological functions are usually linked within the brain. If an error or inconsistency should arise in these relationships, therefore, the brain will try to force these stereoscopic linkages, which creates a situation in which the image feels unnatural or the viewer cannot recognize it as a stereoscopic image.

Incidentally, stereoscopic viewing in the prior art uses only binocular parallax and convergence for representing a stereoscopic view. For that reason, the focus (focal distance) remains substantially constant within the surface of the stereoscopic image (printed material for stereoscopic viewing), so that offsets in binocular parallax or convergence occur at substantially all the locations in the stereoscopic image, making it impossible to implement a stereoscopic view that is easy for the brain of a human being to see.

The stereoscopic image is obtained by synthesizing an image for the left eye and an image for the right eye that have been obtained by photographing a subject with a camera, by way of example. If there is any warping in the image for the left eye and the image for the right eye, therefore, the viewer looking at the stereoscopic image will feel that it is unnatural, or the image may become difficult to be seen stereoscopically.

BRIEF SUMMARY OF THE INVENTION

According to one aspect of the present invention, there is provided an image processing system for performing correction processing on an original image, the image processing system comprising:

a texture coordinates calculation section which divides an area of the original image into first to kth divided image areas (K is an integer greater than or equal to 2) in a mesh form, and obtains texture coordinates specified by coordinates of division points of the first to kth divided image areas; and a texture mapping section which maps images of the first to kth divided image areas onto first to kth polygons based on the obtained texture coordinates, the first to Kth polygons being disposed in a mesh form in a one-to-one relationship with the first to kth divided image areas, wherein the texture coordinates calculation section obtains texture coordinates by dividing the area of the original image into the first to kth divided image areas in such a manner that division spacing in a direction from the original image toward a vanishing point of perspective of the original image becomes narrower as the divided image areas are closer to the vanishing point.

DETAILED DESCRIPTION OF THE EMBODIMENT

Figure 1:
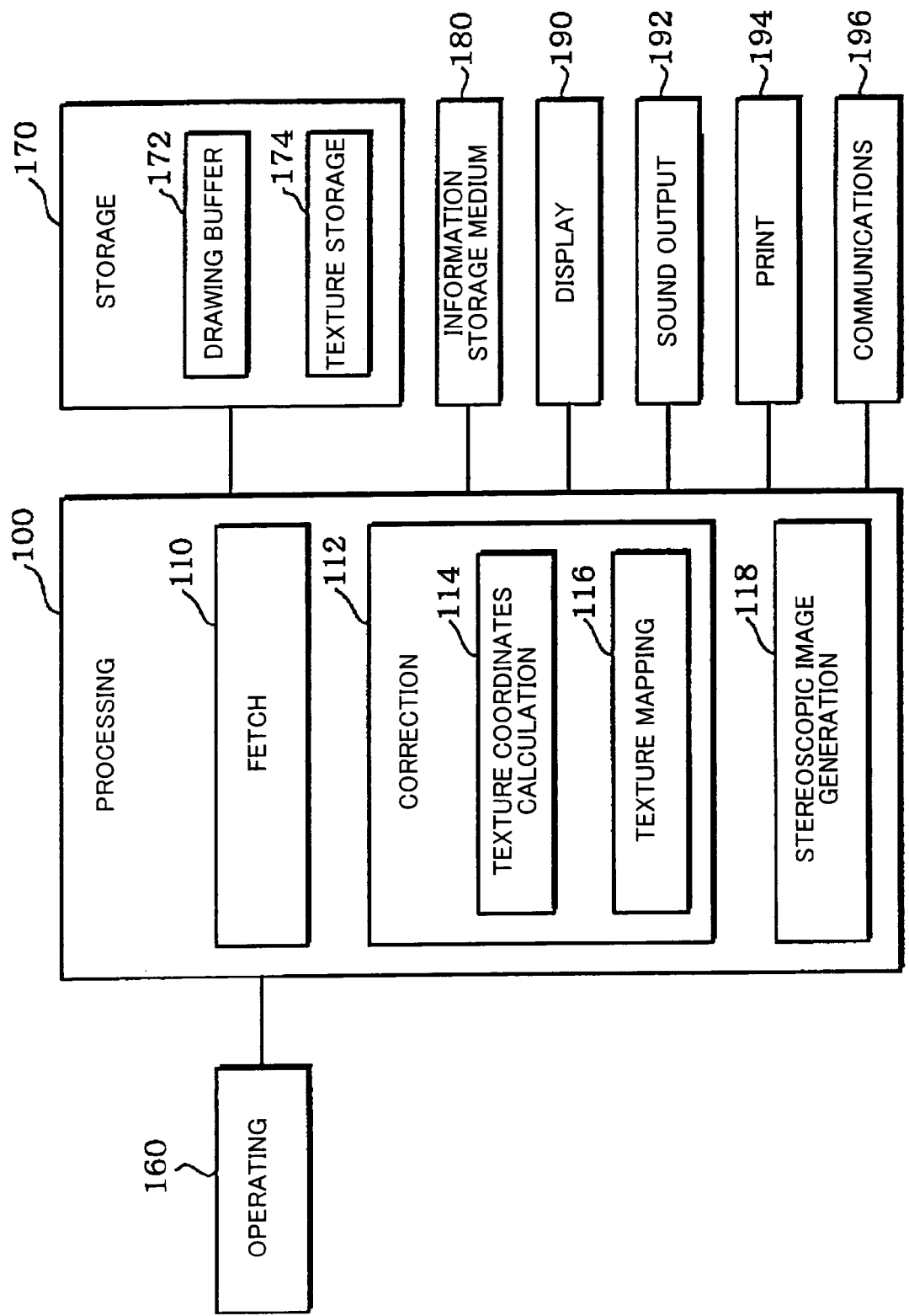
FIG. 1 shows an example of a functional block diagram of an image processing system in accordance with an embodiment of the present invention.

According to one embodiment of the present invention, there is provided an image processing system for performing correction processing on an original image, the image processing system comprising:

a texture coordinates calculation section which divides an area of the original image into first to kth divided image areas (K is an integer greater than or equal to 2) in a mesh form, and obtains texture coordinates specified by coordinates of division points of the first to kth divided image areas; and a texture mapping section which maps images of the first to kth divided image areas onto first to kth polygons based on the obtained texture coordinates, the first to Kth polygons being disposed in a mesh form in a one-to-one relationship with the first to kth divided image areas, wherein the texture coordinates calculation section obtains texture coordinates by dividing the area of the original image into the first to kth divided image areas in such a manner that division spacing in a direction from the original image toward a vanishing point of perspective of the original image becomes narrower as the divided image areas are closer to the vanishing point.

With this embodiment, the area of the original image is divided into first to kth divided image areas in such a manner that division spacing (the spacing of division lines that divide a line extending towards a vanishing point (a first vanishing point) from the original image (around the center of the original image)) becomes narrower as the divided image areas are closer to the vanishing point, and texture coordinates are obtained. By mapping images of the first to kth divided image areas onto first to kth polygons, based on the thus-obtained texture coordinates, the original image is subjected to correction processing to generate an image. This ensures it is possible to implement processing to correct the original image (such as correction processing for removing the perspective of the original image), while minimizing the occurrence of warping of the image.

Note that if there is a second vanishing point in the original image, that second vanishing point can be handled by processing similar to that of the first vanishing point. In other words, the original image area is divided into first to kth divided image areas with a division spacing that in the direction from the original image towards the second vanishing point becomes narrower as the divided image areas are closer to the second vanishing point, to enable to obtain of texture coordinates.

The division spacing can be determined in accordance with reciprocals of the coordinate values of division points in the coordinate system relating to the vanishing point. If an X-Y coordinate system in which a vanishing point (either the first or the second vanishing point) is the origin is assumed, the division spacing can be determined in such a manner that the difference between the reciprocals of the coordinate values of the Jth (where J is an integer) division point and the reciprocals of the coordinate values of the (J+1)th division point is equal to the difference between the reciprocals of the coordinate values of the (J+1)th division point and the reciprocals of the coordinate values of the (J+2)th division point.

In the image processing system, the texture coordinates calculation section:

may obtain coordinates of a first vanishing point which is an intersection between a line extending from a fourth edge of a quadrilateral of which vertices are first to fourth reference points that are set within the area of the original image, and a line extending from a second edge of the quadrilateral which is opposite to the fourth edge;

may obtain coordinates of the first reference point and coordinates of the fourth reference point in an X-Y coordinate system having the first vanishing point as the origin;

may perform linear interpolation between reciprocals of coordinate values of the first reference point and reciprocals of coordinate values of the fourth reference point, and may obtain coordinates of division points on the fourth edge which links the first and fourth reference points, based on reciprocals of values obtained by the linear interpolation;

may obtain coordinates of the second reference point and coordinates of the third reference point in the X-Y coordinate system having the first vanishing point as the origin;

may perform linear interpolation between reciprocals of coordinate values of the second reference point and reciprocals of coordinate values of the third reference point, and may obtain coordinates of division points on the second edge which links the second and third reference points, based on reciprocals of values obtained by the linear interpolation; and may obtain coordinates of division points on edges linking the division points on the fourth and second edges, based on the coordinates of the division points on the fourth edge and the coordinates of the division points on the second edge.

This makes it possible to implement simple processing for division such that division spacing in the direction from the original image towards the vanishing point becomes narrower as the divided image areas are closer to the vanishing point.

In the image processing system, the texture coordinates calculation section may further obtain coordinates of new first to fourth reference points by extrapolation processing on the first to fourth reference points, and may obtain coordinates of division points based on the obtained coordinates of the new first to fourth reference points.

In this manner, the coordinates of the new first to fourth reference points expanded outside of the first to fourth reference points are obtained, coordinates of division points are then obtained based on the coordinates of the new first to fourth reference points. With this configuration, it is possible to obtain suitable correction processing of an original image, even when the original image protrudes outside of a trimmed area which is determined by the first to fourth reference points before expansion.

The image processing system may further comprise:

a fetch section which fetches a first image for the left eye and a first image for the right eye for stereoscopic viewing; and a stereoscopic image generation section which generates a stereoscopic image, wherein the texture coordinates calculation section:

may obtain texture coordinates by dividing an area of the first image for the left eye into first to kth divided image areas for the left eye in such a manner that division spacing in the direction from the first image for the left eye to a vanishing point of perspective of the first image for the left eye becomes narrower as the divided image areas are closer to the vanishing point; and may obtain texture coordinates by dividing an area of the first image for the right eye into first to kth divided image areas for the right eye in such a manner that division spacing in the direction from the first image for the right eye to a vanishing point of perspective of the first image for the right eye becomes narrower as the divided image areas are closer to the vanishing point, wherein the texture mapping section:

may map images for the first to kth divided image areas for the left eye onto first to kth polygons which are disposed in a mesh form in a one-to-one relationship with the first to kth divided image areas for the left eye, to generate a second image for the left eye which has been subjected to correction processing to remove perspective; and may map images for the first to kth divided image areas for the right eye onto first to kth polygons which are disposed in a mesh form in a one-to-one relationship with the first to kth divided image areas for the right eye, to generate a second image for the right eye which has been subjected to correction processing to remove perspective, and wherein the stereoscopic image generation section may generate a stereoscopic image, based on the second image for the left eye and the second image for the right eye.

With this embodiment, the second image for the left eye is generated from the first image for the left eye and the second image for the right eye is generated from the first image for the right eye, by performing correction processing for removing perspective from the first image for the left eye and the first image for the right eye (correction processing for removing perspective at a base surface). The stereoscopic image is generated based on the generated second image for the left eye and second image for the right eye. This makes it possible to provide a stereoscopic image which enables the implementation of a more natural stereoscopic view with few inconsistencies in focal adjustment and depth perception.

Note that when printed material for stereoscopic viewing is created (fabricated) from the generated stereoscopic image in this embodiment, the surface (desk surface or other horizontal surface) on which the printed material for stereoscopic viewing is placed during the stereoscopic viewing can be set to be the base surface. If the stereoscopic image is displayed on a display section, the display screen of the display section can be set to be the base surface.

With this embodiment, the base surface may comprise a first base surface and a second base surface at a predetermined angle to the first base surface; the second image for the left eye may be generated by performing first correction processing for removing the perspective of an image at the first base surface of the first image for the left eye, with respect to an area corresponding to the first base surface in the first image for the left eye, and also performing second correction processing for removing the perspective of an image at the second base surface of the first image for the left eye, with respect to an area corresponding to the second base surface in the first image for the left eye; and the second image for the right eye may be generated by performing first correction processing for removing the perspective of an image at the first base surface of the first image for the right eye, with respect to an area corresponding to the first base surface in the first image for the right eye, and also performing second correction processing for removing the perspective of an image at the second base surface of the first image for the right eye, with respect to an area corresponding to the second base surface in the first image for the right eye.

Such a configuration makes it possible to cancel any unnaturalness in the depth perception which might occur if the object is set on only one base surface. Note that it is also possible to set three or more base surfaces. In addition, the plurality of base surfaces (first and second base surfaces) can be linked together.

In the image processing system, a stereoscopic image may be generated by using anaglyph processing to synthesize the second image for the left eye and the second image for the right eye.

It should be noted that this embodiment could also be applied to the generation of a stereoscopic image by a method other than anaglyph processing.

The embodiments of the present invention are described below with reference to the drawings. Note that the embodiments described below do not limit the scope of the invention defined by the claims laid out herein. In addition, not all of the elements of the embodiments described below should be taken as essential requirements of the present invention.

1. Configuration

A typical functional block diagram of an image processing system (image generation system or game system) of this embodiment is shown in FIG. 1. Note that the image processing system of this embodiment does not necessarily comprise all of the structural elements (components) shown in FIG. 1, and some of them (such as a sound output section 192, a print section 194, and a communications section 196) could be omitted.

The image processing system of FIG. 1 can be used to create a stereoscopic image that synthesizes an image for the left eye and an image for the right eye, or as a system for creating a stereoscopic image that creates printed material for stereoscopic viewing on which is printed a stereoscopic image (such as a CG creation tool, personal computer, or server for creating stereoscopic images). The image processing system of FIG. 1 can also be used as a game system that generates game images (moving images) for stereoscopic viewing in real time.

An operating section 160 is designed to enable an operator (a player) to input operating data, and the functions thereof can be implemented by hardware such as a mouse, keyboard, or game controller.

A storage section 170 acts as a work area for components such as a processing section 100 and the communications section 196, and the functions thereof can be implemented by hardware such as RAM.

An information storage medium 180 (a storage medium that can be read by a computer) is designed to store information such as programs and data, and the functions thereof could be implemented by hardware such as an optical disk (CD or DVD), a magneto-optical (MO) disk, a magnetic disk, a hard disk, or memory (ROM). The processing section 100 performs the various types of processing in accordance with this embodiment, based on a program (data) stored in this information storage medium 180. In other words, within the information storage medium 180 is stored (recorded, or held) a program (a program for causing a computer to implement processing of the sections).

A display section 190 is designed to output images generated by this embodiment of the present invention, and the functions thereof can be implemented by hardware such as a CRT, LCD panel, touch-panel display, or head-mounted display (HMD).

The sound output section 192 is designed to output sounds created by this embodiment, and the functions thereof can be implemented by hardware such as a speaker or headphones.

The print section 194 prints the stereoscopic image on a print medium (such as paper, a lens, or film), and the functions thereof can be implemented by a color printer using a method such as an inkjet printer method or laser printer method (generally speaking: a printer).

The communications section 196 is designed to provide various types of control for communicating with an external device (such as a host device or another image generation system), and the functions thereof can be implemented by hardware such as various types of processor or a communications ASIC, or by a program.

Note that a program (data) for causing a computer to function as the various sections of this embodiment could be distributed to the storage section 170 or the information storage medium 180 from an information storage medium possessed by a host device (server), through a network and the communications section 196. Such use of an information storage medium on the host device (server) is also comprised within the scope of the present invention.

The processing section 100 (processor) performs various types of processing, such as image generation processing or sound generation processing, based on manipulation data or input information from the operating section 160 or a program. The processing section 100 uses the storage section 170 as a work area for the various processes. The functions of this processing section 100 could be implemented by hardware such as various different processors (such as a CPU or DSP) or an ASIC (gate array), or by a program (game program).

Note that if the image processing system of FIG. 1 is applied to a game system, the processing section 100 also performs game processing for generating game images. The game processing in such a case includes processing such as that for starting the game, based on game start conditions (such as the selection of course, map, character, or number of participating players); processing for disposing graphic objects such as characters and maps; processing for displaying the graphic objects; processing for calculating game results; or processing for ending the game when a game end condition has been satisfied.

The processing section 100 comprises a fetch section 110, a correction section 112, and a stereoscopic image generation section 118. Note that some of these components could be omitted.

The fetch section 110 performs processing for fetching (reading or downloading) an image IL1 for the left eye (a first image for the left eye) and an image IR1 for the right eye (a first image for the right eye). More specifically, the fetch section 110 reads the image IL1 for the left eye and the image IR1 for the right eye that have been stored (saved) in the information storage medium 180 (the storage section 170). Alternatively, the fetch section 110 downloads the image IL1 for the left eye and the image IR1 for the right eye from a network such as the Internet, through the communications section 196. Further alternatively, the fetch section 110 reads the image IL1 for the left eye and the image IR1 for the right eye from a camera or scanner that is connected by the communications section 196 (by USB or IEEE 1394). The thus fetched image IL1 for the left eye and the image IR1 for the right eye are used as original images before correction processing.

Note that the image IL1 for the left eye and the image IR1 for the right eye are stereoscopic images and so are images employing binocular parallax. Specifically, a camera (or virtual camera) is disposed at the viewpoint position for the left eye and the line-of-sight direction of that camera is pointed towards the subject (graphic object, main viewpoint) to generate (create) the image IL1 for the left eye. Similarly, a camera is disposed at the viewpoint position for the right eye and the line-of-sight direction of that camera is pointed towards the subject (graphic object, main viewpoint) to generate (create) the image IR1 for the right eye.

Note that the image IL1 for the left eye and the image IR1 for the right eye could also be generated in real time as game images. In such a case, the processing section 100 (the image generation section) generates the image IL1 for the left eye as an image as seen from the viewpoint position for the left eye (a virtual camera for the left eye) within the object space. Similarly, the processing section 100 generates the image IR1 for the right eye as an image as seen from the viewpoint position for the right eye (a virtual camera for the right eye) within the object space. The thus generated image IL1 for the left eye and the image IR1 for the right eye are stored in the storage section 170 (a drawing buffer 172 and texture storage section 174).

Images as seen from virtual cameras in such a case can be generated as described below. In other words, geometry processing such as coordinate conversion, clipping processing, transparency conversion is first performed, then drawing data (such as the position coordinates of the vertices of primitive surfaces, texture coordinates, color data, vector lines, or a values) are created based on the results of that processing. Graphic objects (comprising one or a plurality of primitive surfaces) after the transparency conversion (after geometry processing) are drawn into the drawing buffer 172 (frame buffer, or a buffer that enables the storage of image information in pixel units, such as a work buffer), based on this drawing data (primitive surface data). This causes the generation of images as seen from virtual cameras within the object space.

The correction section 112 does processing for correcting the image IL1 for the left eye and the image IR1 for the right eye (generally speaking: the original images). More specifically, the correction section 112 subjects the image IL1 for the left eye to correction processing for removing the perspective of the image at a base surface BS (the surface on which the subject or graphic object is disposed), to generate an image IL2 for the left eye (a second image for the left eye). Similarly, the processing section 100 subjects the image IR1 for the right eye to correction processing for removing the perspective of the image at the base surface, to generate an image IR2 for the right eye (a second image for the right eye). This correction processing can be implemented by performing texture mapping that adds texture to the image IL1 for the left eye and the image IR1 for the right eye (original images) from the texture storage section 174.

The correction section 112 comprises a texture coordinates calculation section 114. This texture coordinates calculation section 114 obtains texture coordinates that are addresses for reading textures (original images) from the texture storage section 174. More specifically, the texture coordinates calculation section 114 divides the areas (trimmed areas) of original images (or the image IL1 for the left eye and the image IR1 for the right eye, hereinafter the same) into a mesh of first to kth divided image areas (where K is an integer greater than or equal to 2). In other words, the texture coordinates calculation section 114 obtains the coordinates of division points that are mesh (grid) points of each area that has been divided into a mesh. It then obtains texture coordinates (texture coordinates that give the vertices of a polygon that corresponds in a one-to-one manner to the division points) specified by the coordinates of the division points (including reference points) of the first to kth divided image areas (or first to kth divided image areas for the left eye and the right eye, hereinafter the same). The area of each original image is divided into first to kth divided image areas in such a manner that division spacing (the spacing used for a plurality of divisions orthogonal to a direction from the center of the original image towards a vanishing point of perspective) becomes narrower as the divided image areas are closer to the vanishing point, to obtain texture coordinates.

Note that the vanishing point is the point of intersection of two straight lines that express the perspective (warping) of the original image (the straight line joining the first and fourth reference points and the straight line joining the second and third reference points).

The correction section 112 comprises a texture mapping section 116. This texture mapping section 116 performs processing for mapping a texture (original image) stored in the texture storage section 174 onto a polygon. More specifically, the texture mapping section 116 maps images of the first to kth divided image areas onto first to kth polygons, based on texture coordinates (U, V) obtained by the texture coordinates calculation section 112. In other words, the first to kth polygons (which are polygons obtained by dividing one rectangle in to K polygons) are disposed adjacent to one another in a one-to-one relationship with the first to kth divided image areas. The texture mapping section 116 then maps the image (texture) of the first divided image area onto the first polygon, the Lth (where L is an integer such that $1 \leq L \leq k$) divided image area onto the Lth polygon, and the kth divided image area onto the kth polygon.

The stereoscopic image generation section 118 performs processing to generate the stereoscopic image, based on the image IL2 for the left eye and the image IR2 for the right eye. For example, the stereoscopic image generation section 118 generates the stereoscopic image by synthesizing the image IL2 for the left eye and the image IR2 for the right eye by anaglyph processing. The thus-generated image for stereoscopic viewing is written (saved) to the storage section 170 or the information storage medium 180. Alternatively, the thus-generated image for stereoscopic viewing could be distributed to an external system through the communications section 196 and a network (the Internet). Further alternatively, the thus-generated image for stereoscopic viewing could be displayed on the display section 190. In such a case, the stereoscopic viewing is implemented by the viewer (operator or player) wearing spectacles provided with a red-colored filter for the left eye and a blue-colored filter for the right eye to view the thus-displayed image for stereoscopic viewing. Alternatively, the stereoscopic image generation section 118 could output the image IL2 for the left eye and the image IR2 for the right eye to the display section 190 in different frames. In such a case, the stereoscopic viewing is implemented by the viewer wearing spectacles provided with left and right shutters that open and close in synchronization with the frames.

2. Correction Processing Using Texture Mapping

The description now turns to the correction processing of this embodiment, with reference to the accompanying figures.

Figure 2A:
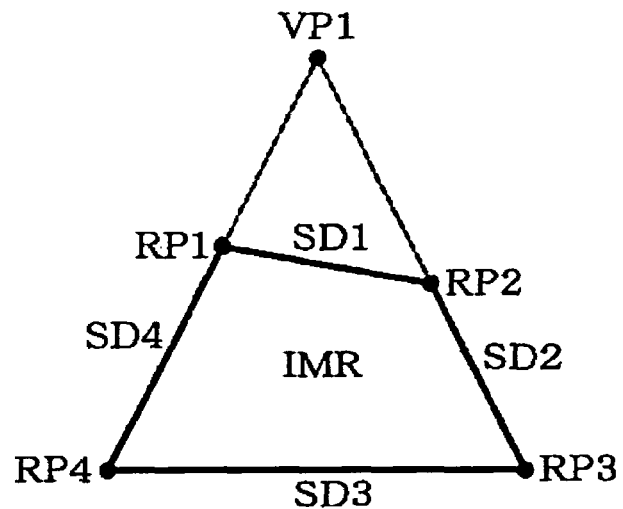
FIGS. 2A and 2B are illustrative of the correction processing of an embodiment of the present invention.

In FIG. 2A, reference points RP1, RP2, RP3, and RP4 (first to fourth reference points) have been set in the area IMR of the original image (trimmed area of original image). This setting of the reference points RP1 to RP4 can be implemented by placing four marks (four marks at the vertices of a rectangle) at peripheral portions of the subject when the original images (the image IL1 for the left eye and the image IR1 for the right eye) were taken by the camera(s), by way of example.

The reference points RP1 to RP4 set in the original image area IMR form the vertices of a quadrilateral. A vanishing point VP1 (a first vanishing point) is the intersection between a line extending from an edge SD4 (fourth edge) of that quadrilateral and a line extending from an edge SD2 (second edge) towards the edge SD4. In other words, the vanishing point VP1 is the intersection between a straight line passing through the reference points RP1 and RP4 and a straight line passing through the reference points RP2 and RP3.

Figure 2B:
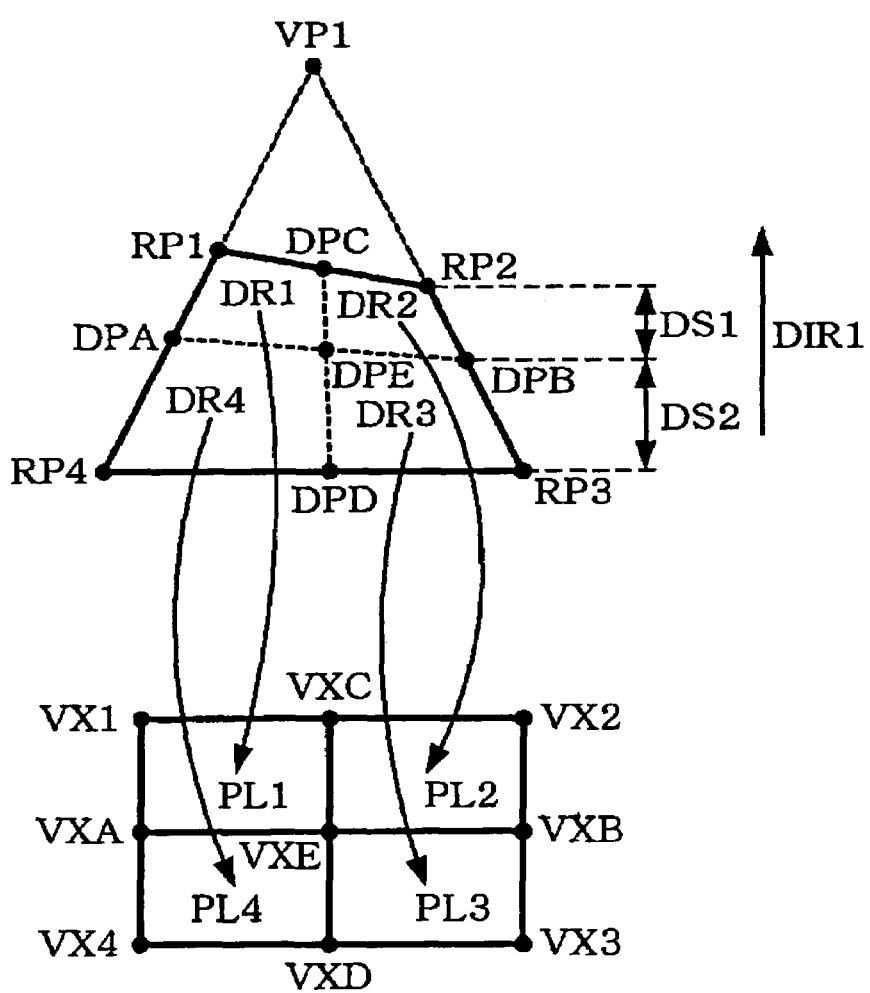

In this embodiment, the original image area IMR is divided into divided image areas DR1 to DR4 (generally speaking: first to kth divided image areas), as shown in FIG. 2B, the coordinates of division points DPA to DPE (RP1 to RP4) of the divided image areas DR1 to DR4 are obtained, and the texture coordinates are specified by the thus-obtained coordinates. Images of the divided image areas DR1 to DR4 are mapped onto polygons PL1 to PL4 (generally speaking: first to kth polygons) that are disposed to correspond to the divided image areas DR1 to DR4, based on these texture coordinates. More specifically, the texture coordinates specified by the coordinates of the division points DPA to DIE and RP1 to RP4 correspond to vertices VXA to VXE and VX1 to VX4 of the polygons PL1 to PL4, and the original images (the image IL1 for the left eye and the image IR1 for the right eye) stored in the texture storage section 174 are read out, based on the thus-associated texture coordinates, and mapped onto the polygons PL1 to PL4.

In this case as shown in FIG. 2B, the original image area IMR is divided into the divided image areas DR1 to DR4 by this embodiment in such a manner that division spacing in a direction DIR1 toward the vanishing point VP1 from the original image (IMR) gets smaller as the divided areas are closer to the vanishing point VP1. In other words, DR1 to DR4 are divided in such a manner that a division spacing DS1 for the divided image areas DR1 and DR2 closer to the vanishing point VP1 is smaller than a division spacing DS2 for the divided image area DR3 and DR4 farther from the vanishing point VP1. This makes it possible to keep warping of the image generated by the correction processing for removing the perspective of the original image to a minimum.

Note that the number of divisions in the direction DIR1 (Y direction) of FIG. 2B is two and the number of divisions in the direction orthogonal to DIR1 (the X direction) is also two, but the number of divisions could equally well be three or more. As the number of divisions increases, the processing load also increases but warping of the image can be reduced.

Figure 3:
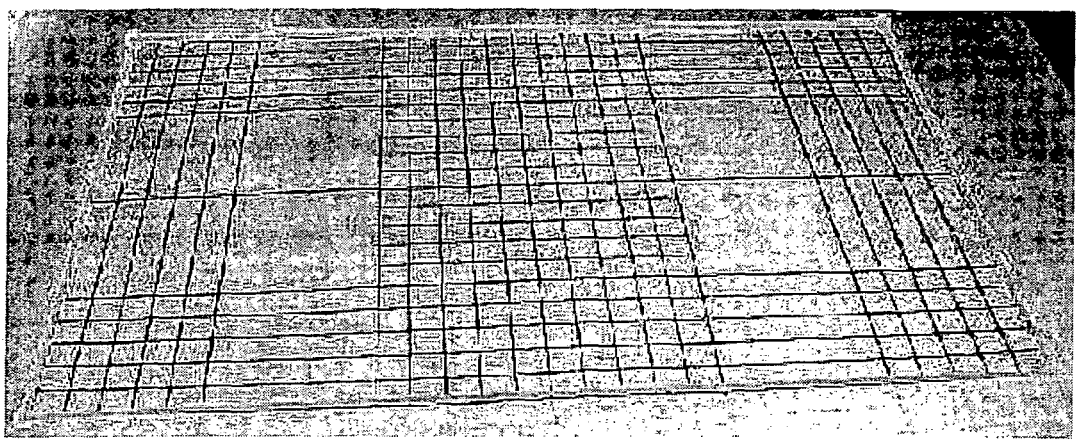
FIG. 3 shows an example of an original image.

An example of an original image is shown in FIG. 3. The original image of FIG. 3 is an image obtained by drawing lines along the vertical and horizontal lines of graph paper, placing the graph paper (generally speaking: a subject) on a mounting surface (base surface), then using a camera to capture the image thereof. This original image forms an image captured by a camera placed at the viewpoint position for the left eye.

Figure 4:
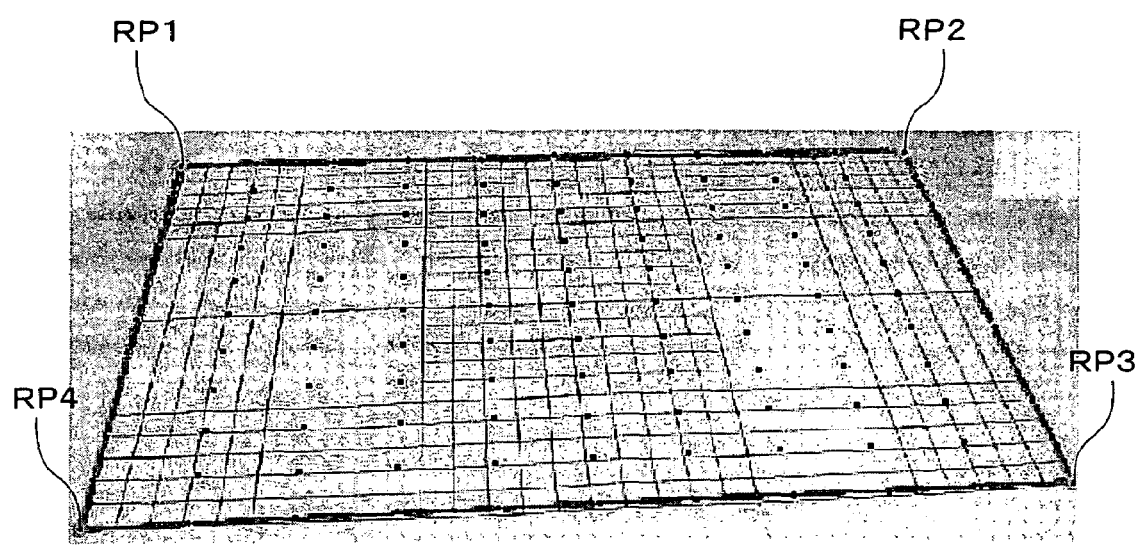
FIG. 4 shows a state in which an original image area has been divided into divided image areas.

FIG. 4 shows the state in which the original image area has been divided into 10×10 (generally speaking: N×M) divided image areas in a mesh form, based on the reference points RP1 to RP4 (equivalent to vertices on the rectangular graph paper) that have been set on the original image. The black spots of FIG. 4 are equivalent to division points (including reference points, hereinafter the same). With this embodiment, texture coordinates are obtained by obtaining the coordinates (X, Y) of these division points. Images (textures) of divided image areas are mapped onto the thus-divided polygons (the polygons obtained by dividing the rectangular polygon into N×M polygons) that correspond in a one-to-one manner to the divided image areas, based on the thus-obtained texture coordinates.

Figure 5:
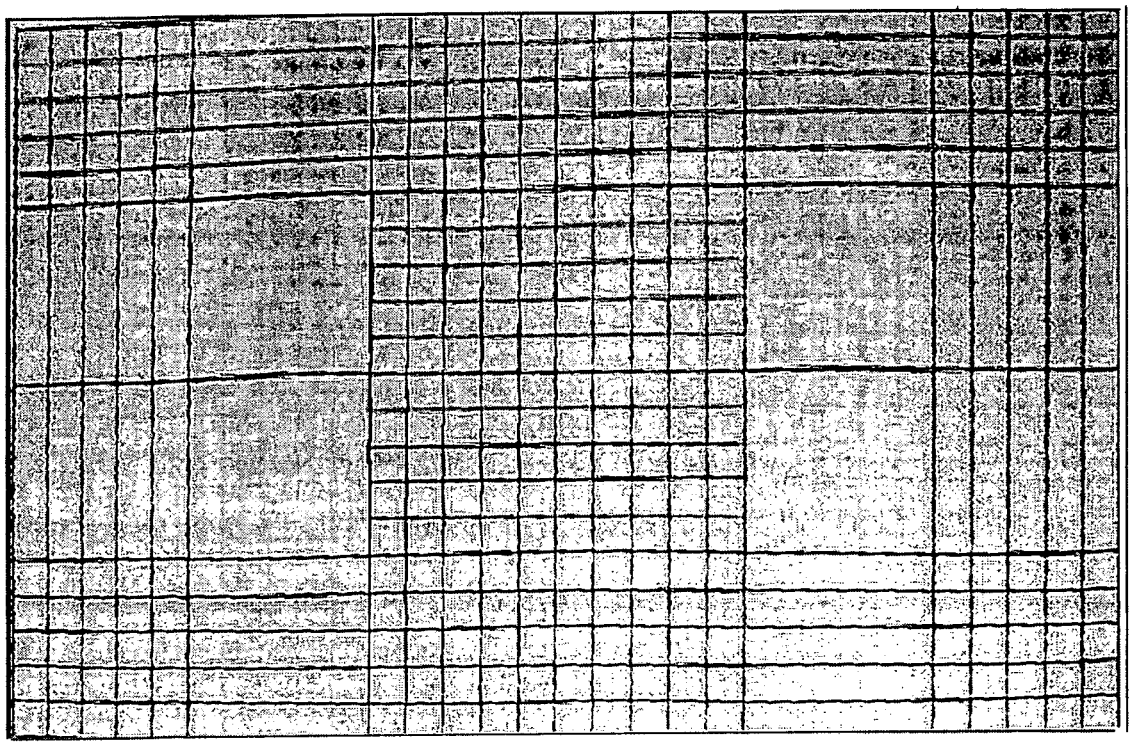
FIG. 5 shows an example of an image generated by the correction processing of an embodiment of the present invention.

An image generated by the above-described texture mapping is shown in FIG. 5. The method of this embodiment, as shown in FIG. 5 removes the perspective possessed by the original image (removes the perspective of a mounting surface that is a base surface) that is shown in FIG. 3. In other words, the method of this embodiment makes it possible to implement correction processing for removing the perspective of the original image.

Figure 6:
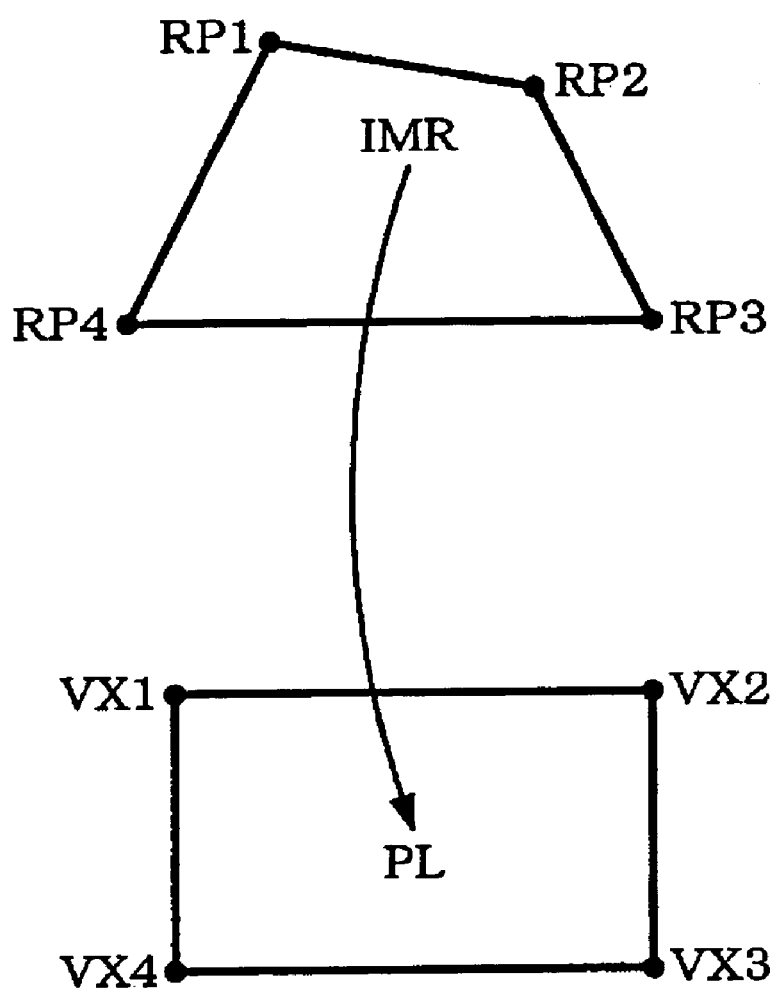
FIG. 6 is illustrative of a first comparative example.

A method of mapping the image of the original image area IMR onto one rectangle polygon PL could be considered as a first comparative example, as shown in FIG. 6. In other words, texture mapping is done to apply the texture coordinates given by the coordinates of the reference points RP1 to RP4 onto the vertices VX1 to VX4 of the polygon PL.

With this first comparative example, however, a large amount of warping occurs in the thus-generated image. In other words, the vertical lines and horizontal lines of the graph paper that ought to be orthogonal originally are no longer orthogonal and thus it is not possible to restore the image of the mesh-shaped graph paper.

Figure 8:
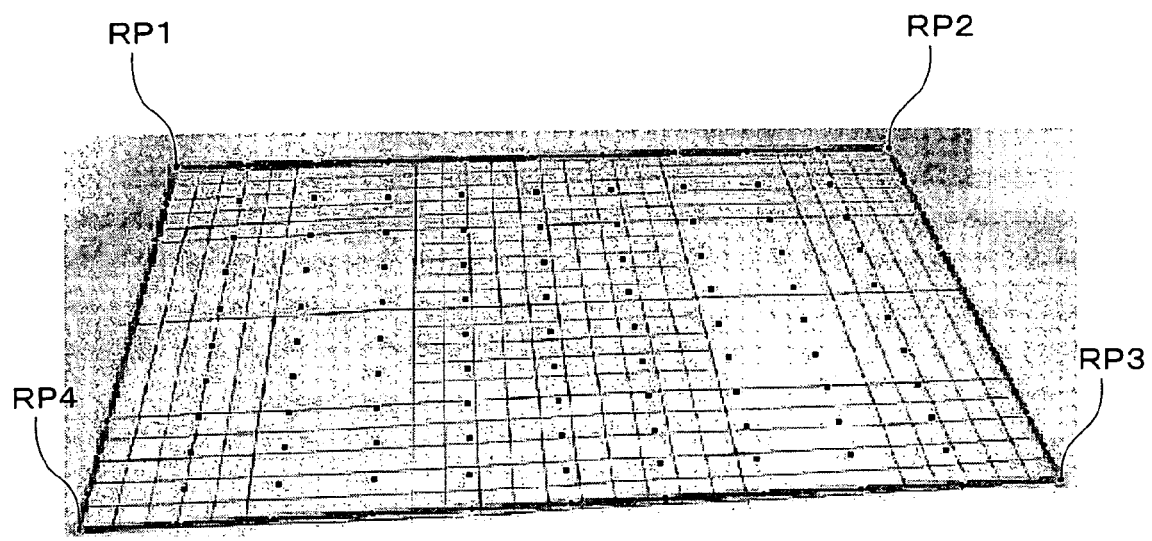
FIG. 8 is illustrative of a second comparative example.

Another method could be considered as a second comparative example, in which the original image area IMR is divided at uniform spacing, as shown in FIG. 8. In other words, division spacing DS1 is narrower than DS2 in this embodiment shown in FIG. 2B, but in this comparative example, the division spacings DS1 and DS2 are the same and correction in the depthwise direction is not considered. With this embodiment shown in FIG. 4, for example, the positions of the division points (the black spots) substantially match the positions of the grid (mesh points) of the graph paper, but in the comparative example shown in FIG. 8, the positions of the division points are shifted from the positions of the grid points on the graph paper.

Figure 9:
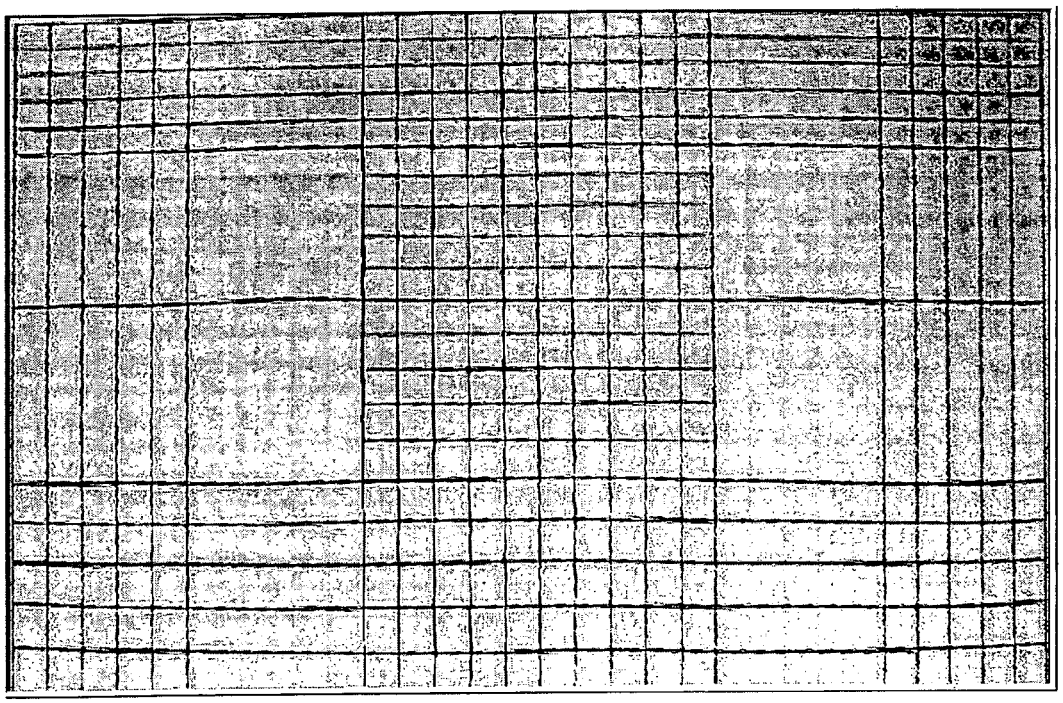
FIG. 9 shows an example of an image generated by the second comparative example.

With this second comparative example, the grid on the graph paper that was originally at a uniform spacing loses that uniform spacing, as shown in FIG. 9. For example, the grid spacing at the upper side of FIG. 9 becomes narrower and that at the lower side becomes wider. If the image of FIG. 9 that is generated for the second comparative example is used in the image for the left eye and the image for the right eye for stereoscopic viewing, therefore, correct stereoscopic viewing cannot be implemented.

In contrast thereto, this embodiment ensures that the grid of the graph paper is at a substantially uniform spacing, as shown in FIG. 5, enabling a substantially accurate restoration of the image of the graph paper that is photographed. The grid spacing at the upper side of FIG. 5 is equal to the grid spacing at the lower side thereof, by way of example. If the image of FIG. 9 that is generated by this embodiment is used in the image for the left eye and the image for the right eye for stereoscopic viewing, therefore, it is possible to implement highly precise stereoscopic viewing in comparison with the second comparative example. Note that the number of divisions could be increased further to further increase the precision.

This embodiment as described above makes it possible to implement correction processing that restores an image without perspective as shown in FIG. 5, from the original image with perspective as shown in FIG. 3. Moreover, this correction processing can be implemented just by dividing the original image area IMR as shown in FIG. 2B and obtaining texture coordinates, then performing the texture mapping based on the thus-obtained texture coordinates. Since this therefore makes it possible to implement correction processing by simply substituting the texture coordinates obtained by division as arguments into a texture mapping function of a CG program (such as OpenGL), for example, it can simplify the processing. Since it is also possible to implement the correction processing without using dedicated hardware, it is possible to provide a correction processing program that is highly universal.

3. Detailed Example of Correction Processing

Figure 10:
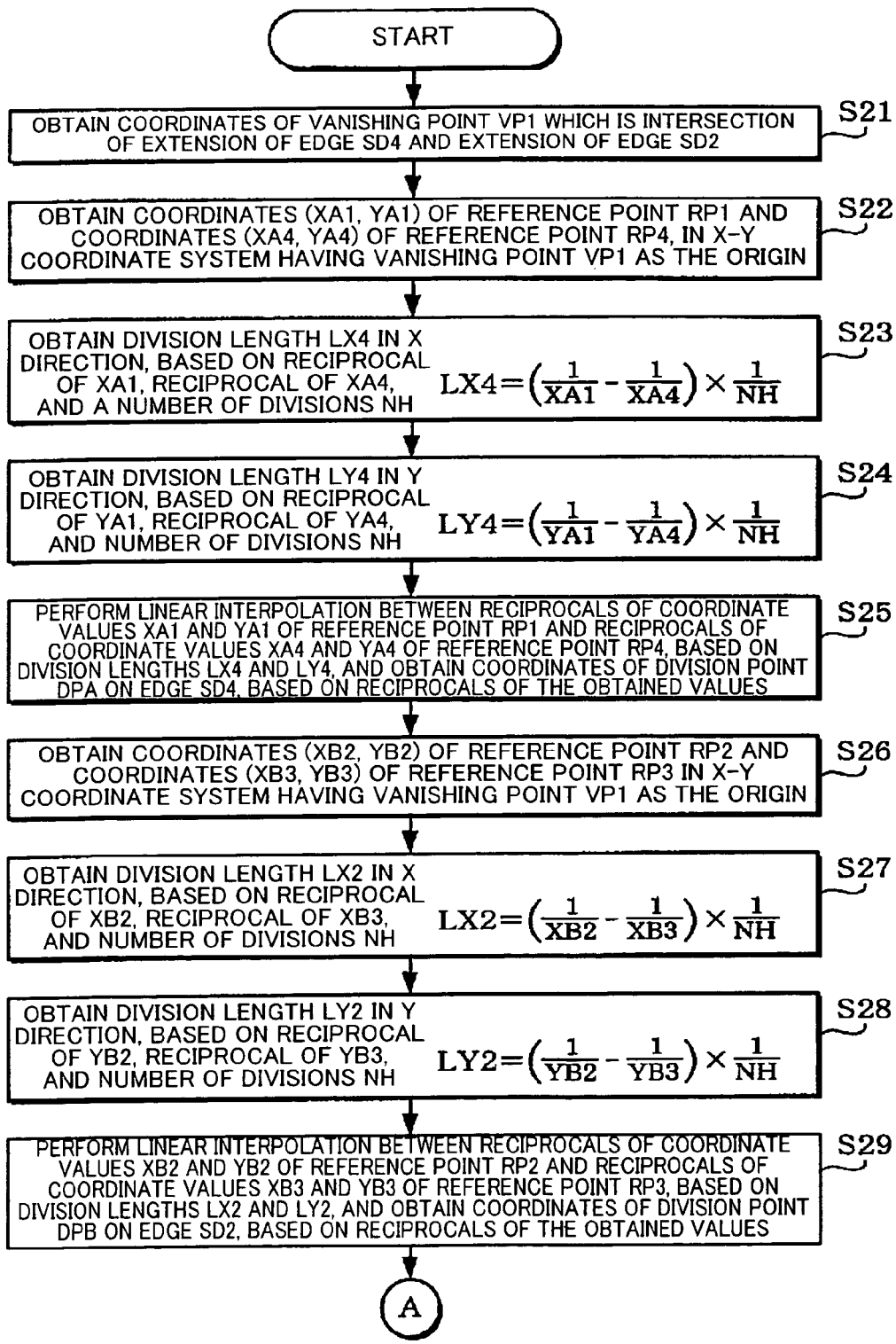
FIG. 10 is a flowchart of the correction processing in accordance with an embodiment of the present invention.
Figure 11:
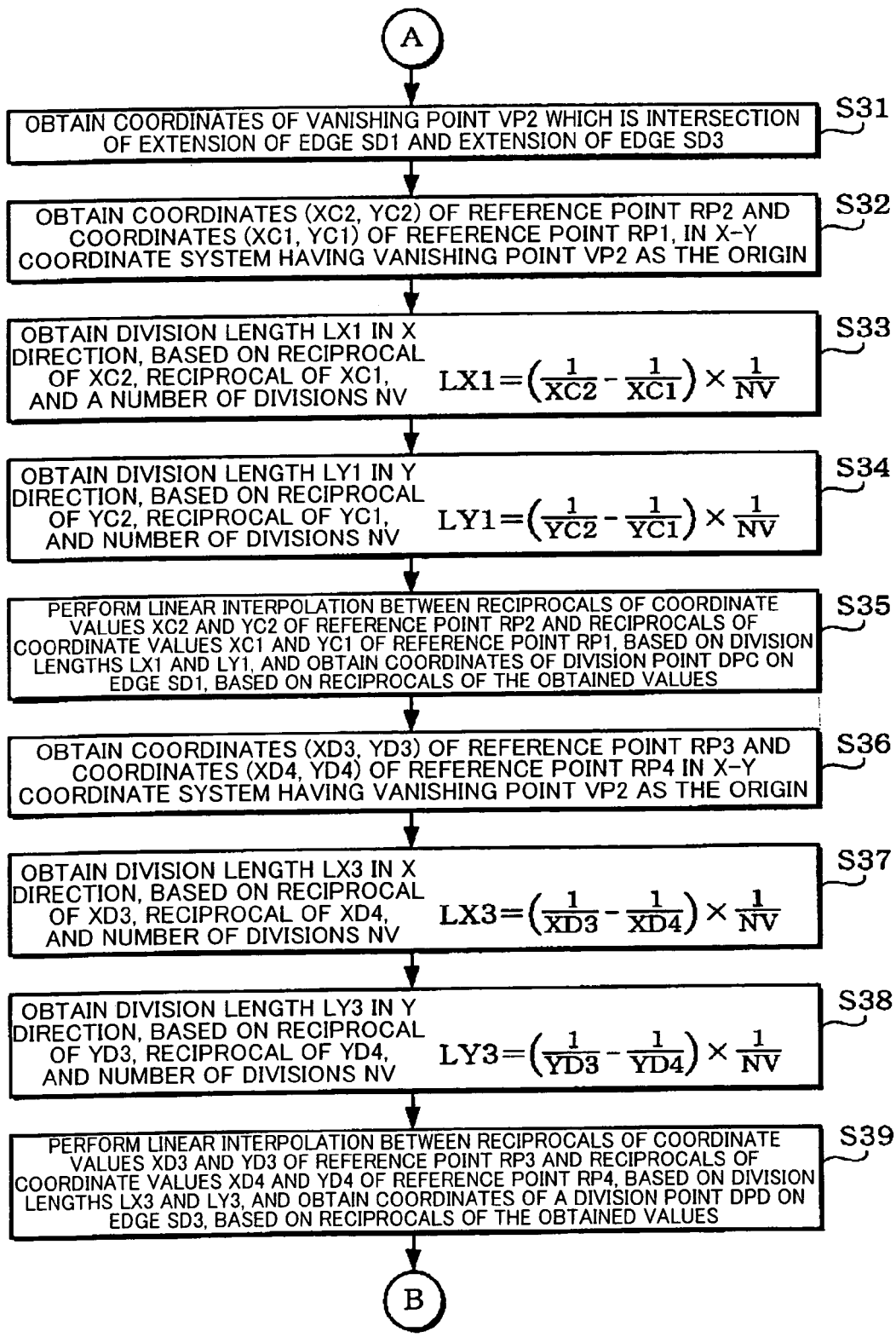
FIG. 11 is another flowchart of the correction processing in accordance with an embodiment of the present invention.
Figure 12:
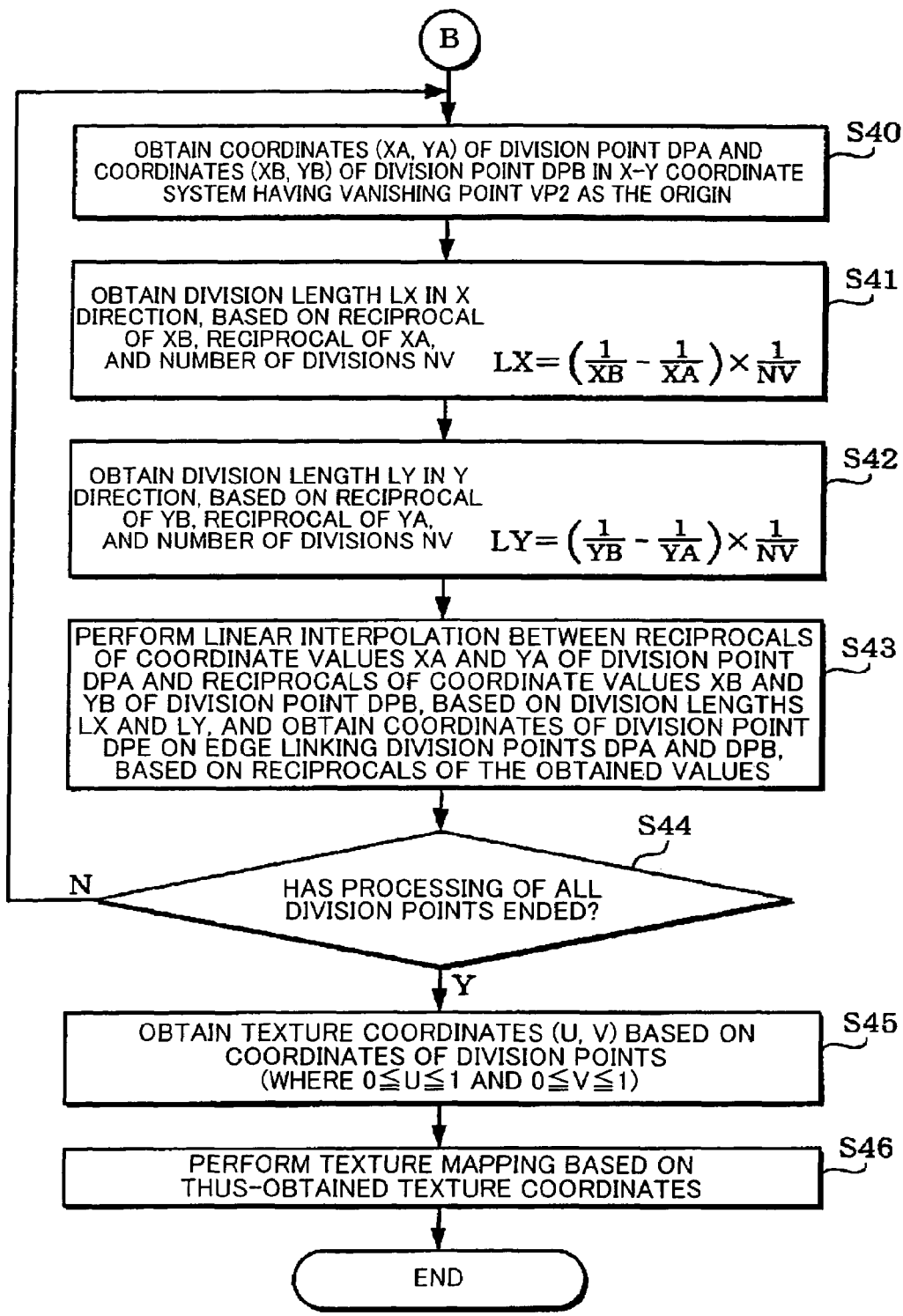
FIG. 12 is a further flowchart of the correction processing in accordance with an embodiment of the present invention.

The description now turns to a detailed example of the correction processing of this embodiment, with reference to the flowcharts of FIGS. 10 to 12 and schematic views of the processing of this embodiment in FIGS. 13A to 15B.

Figure 13A:
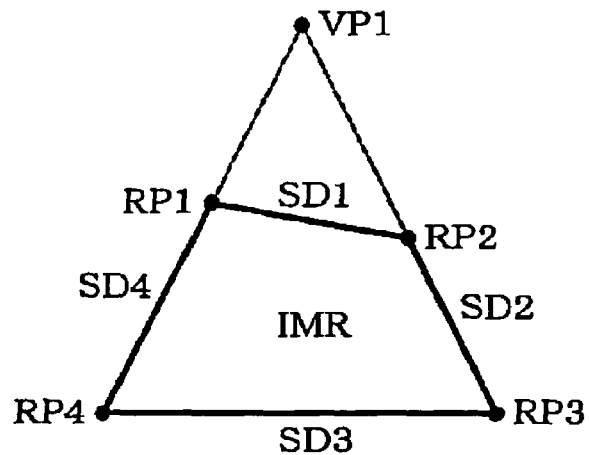
FIGS. 13A, 13B, and 13C are conceptual diagrams of the correction processing in accordance with an embodiment of the present invention.

The system first obtains the coordinates of the vanishing point VP1 (the first vanishing point) that is the intersection of the extension of the edge SD4 and the extension of the edge SD2 of the quadrilateral formed by the reference points RP1 to RP4, as shown in FIG. 13A (step S21).

Figure 13B:
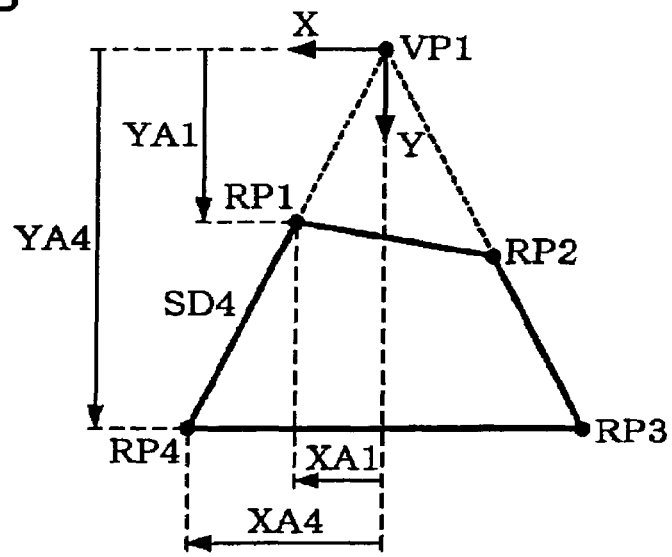

It then assumes an X-Y coordinate system in which the vanishing point VP1 is the origin, and obtains the coordinates (XA1, YA1) of the reference point RP1 and the coordinates (XA4, YA4) of the reference point RP4, as shown in FIG. 13B (step S22). These coordinates can be obtained from the distance in the X and Y directions between VP1 and RP1 and the distance in the X and Y directions between VP1 and RP4.

The system then obtains a division length LX4 in the X direction (a division length in reciprocal representation), based on the reciprocal of the coordinate value XA1, the reciprocal of the coordinate value XA4, and a number of divisions NH (step S23).

$$LX4 = (1/XA1 - 1/XA4) \times (1/NH) \quad (1)$$

It also obtains a division length LY4 in the Y direction (a division length in reciprocal representation), based on the reciprocal of the coordinate value YA1, the reciprocal of the coordinate value YA4, and the number of divisions NH (step S24).

$$LY4 = (1/YA1 - 1/YA4) \times (1/NH) \quad (2)$$

Figure 13C:
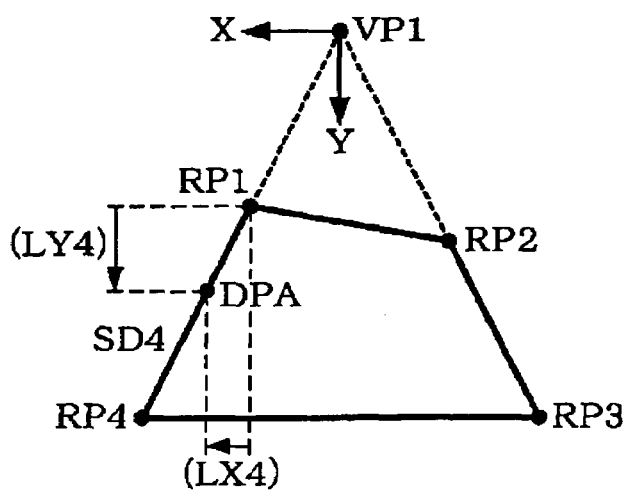

It then performs linear interpolation between the reciprocals of the coordinate values XA1 and YA1 of the reference point RP1 and the reciprocals of the coordinate values XA4 and YA4 of the reference point RP4, based on the thus-obtained division lengths LX4 and LY4, obtains the reciprocals of the values obtained by the linear interpolation, and obtains the coordinates of division point DPA on the edge SD4, based on reciprocals of the obtained values, as shown in FIG. 13C (step S25). Note that LX4 and LY4 are division lengths in reciprocal representation, which differ from the actual division length in the X direction and the actual division length in the Y direction between RP1 and DPA of FIG. 13C. For that reason, they are denoted by (LX4) and (LY4) in FIG. 13C.

If XA1=2.5, XA4=4.0, and the number of divisions NH=3, by way of example, the division length LX4=(1/2.5−1/4)×(1/3)=0.05. In such a case, the values 0.35 and 0.3 are obtained by linear interpolation with the division length LX4=0.05, between 1/XA1=0.4 and 1/XA4=0.25. Obtaining the reciprocals of these values 0.35 and 0.3 give 1/0.35=2.85 ... and 1/0.3=3.33. The thus-obtained values 2.85 ... and 3.33 ... are the X coordinate values of the division point DPA.

Figure 14A:
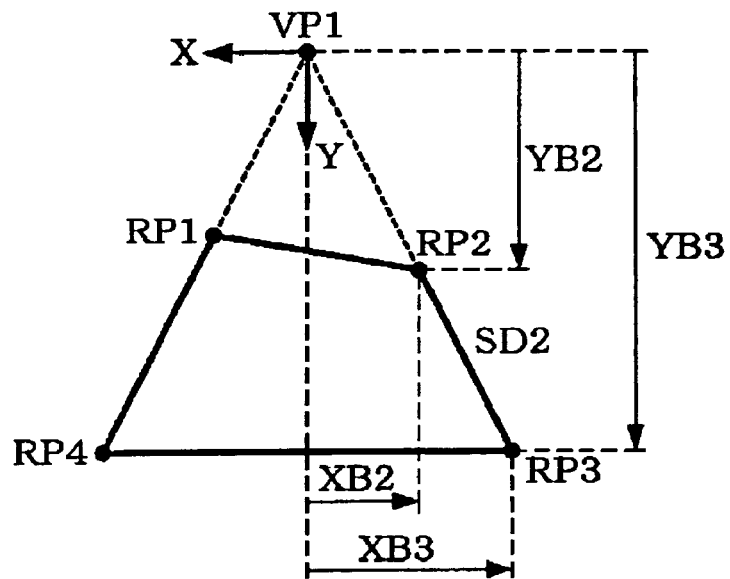
FIGS. 14A and 14B are illustrative of the correction processing in accordance with an embodiment of the present invention.

Next, as shown in FIG. 14A, the system obtains the coordinates (XB2, YB2) of reference point RP2 and the coordinates (XB3, YB3) of reference point RP3 in the X-Y coordinate system having the vanishing point VP1 as origin (step S26). These coordinates can be obtained by the distance in the X and Y directions between VP1 and RP2 and between VP1 and RP3.

The system then obtains a division length LX2 in the X direction, based on the reciprocal of the coordinate value XB2, the reciprocal of the coordinate value XB3, and the number of divisions NH (step S27).

$$LX2=(1/XB2-1/XB3)\times(1/NH) \quad (3)$$

It also obtains a division length LY2 in the Y direction, based on the reciprocal of the coordinate value YB2, the reciprocal of the coordinate value YB3, and the number of divisions NH (step S28).

$$LY2=(1/YB2-1/YB3)\times(1/NH) \quad (4)$$

Figure 14B:
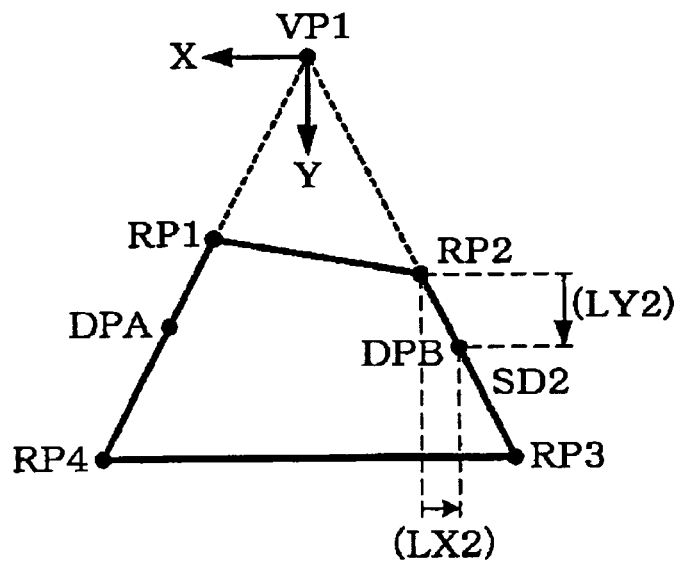

It then performs linear interpolation between the reciprocals of the coordinate values XB2 and YB2 of the reference point RP2 and the reciprocals of the coordinate values XB3 and YB3 of the reference point RP3, based on the thus-obtained division lengths LX2 and LY2, obtains the reciprocals of the values obtained by the linear interpolation, and obtains the coordinates of a division point DPB on the edge SD2, based on reciprocals of the obtained values, as shown in FIG. 14B (step S29). Note that LX2 and LY2 are division lengths in reciprocal representation, which differ from the actual division length in the X direction and the actual division length in the Y direction between RP2 and DPB of FIG. 14B. For that reason, they are denoted by (LX2) and (LY2) in FIG. 14B.

Figure 15A:
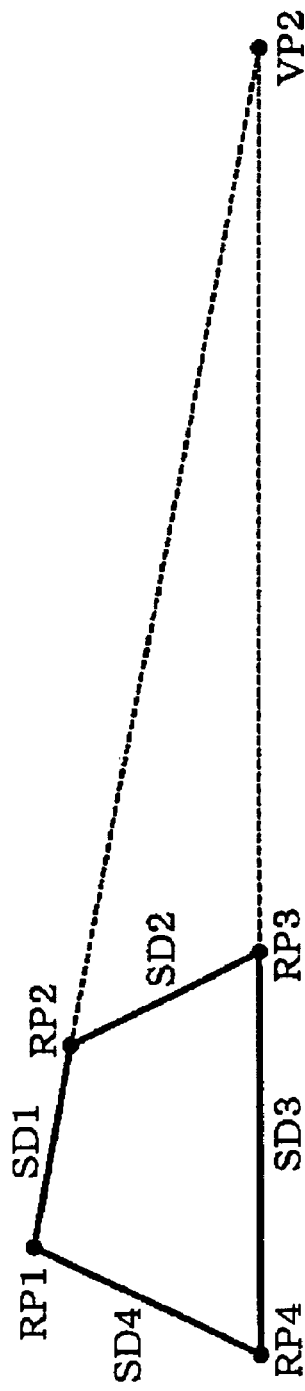
FIGS. 15A and 15B are illustrative of the correction processing in accordance with an embodiment of the present invention.

The system then obtains the coordinates of a vanishing point VP2 (a second vanishing point) that is the intersection of the extension of the edge SD4 and the extension of the edge SD3, as shown in FIG. 15A (step S31 of FIG. 11).

Figure 15B:
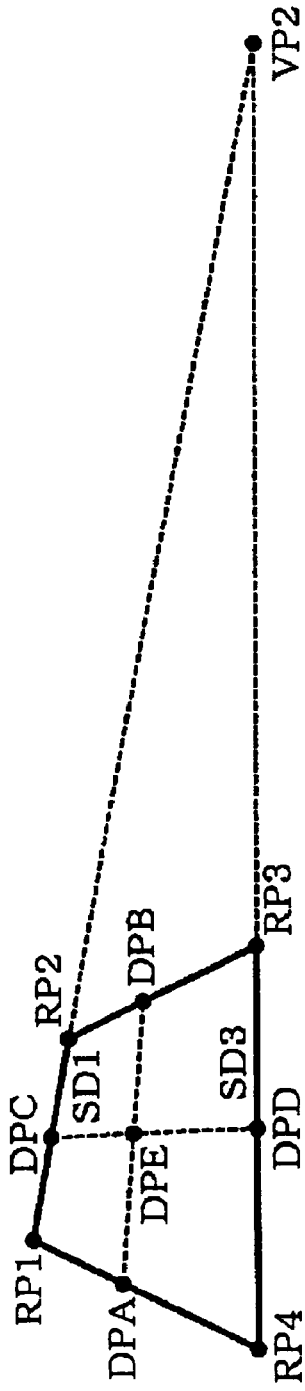

It then performs processing similar to that of steps S22 to S29 of FIG. 10 to obtains the coordinates of the division points DPC and DPD on the edges SD1 and SD2, as shown in FIG. 15B (steps S32 to S39). Note that if the vanishing point VP2 does not exist (if the edges SD1 and SD3 are parallel), the coordinates of the division points DPC and DPD could be obtained by simple linear interpolation between the reference points RP1 and RP2 and the reference points RP4 and RP3.

The system then obtains the coordinates (XA and YA) of the division point DPA and the coordinates (XB and YB) of the division point DPB in the X-Y coordinate system having the vanishing point VP2 as origin (step S40).

It obtains a division length LX in the X direction, based on the reciprocal of the coordinate value XB, the reciprocal of the coordinate value XA, and the number of divisions NV (step S41).

$$LX=(1/XB-1/XA)\times(1/NV) \quad (5)$$

It also obtains a division length LY in the Y direction, based on the reciprocal of the coordinate value YB, the reciprocal of the coordinate value YA, and the number of divisions NV (step S42).

$$LY=(1/YB-1/YA)\times(1/NV) \quad (6)$$

The system then performs linear interpolation between the reciprocals of the coordinate values XA and YA of the division point DPA and the reciprocals of the coordinate values XB and YB of the division point DPB, based on the thus-obtained division lengths LX and LY, obtains the reciprocals of the values obtained by the linear interpolation, and obtains the coordinates of a division point DPE on the edge linking the division points DPA and DPB, based on the thus-obtained reciprocals, as shown in FIG. 15B (step S43).

The system then determines whether or not the processing for all the division points has ended (step S44) and, if it has not ended, returns to step S40 to perform the processing for the next division point. If it has ended, on the other hand, the system obtains the texture coordinates (U, V) based on the coordinates of the division points (step S45). In other words, it converts the division point coordinates to texture coordinates (U, V), assuming the domain $0 \leq U \leq 1$ and $0 \leq V \leq 1$. Assume by way of example that the coordinates of the vertices PX1, PX2, PX3, and PX4 of the original image, which is a rectangle of I×J pixels, are (0, J), (I, J), (I, 0), (0, 0). In this case, the division point coordinates are converted into texture coordinates in such a manner that the texture coordinates (U, V) set for these vertices PX1, PX2, PX3, and PX4 are normalized to (0, 1), (1, 1), (1, 0), (0, 0).

The system performs texture mapping onto the polygon that is divided as described with reference to FIG. 2B, based on the thus-obtained texture coordinates (U, V) (step S46). This generates the image after correction processing, such as that shown in FIG. 5. The thus-generated image is written (saved) to the storage section 170 or the information storage medium 180.

Note that the correction processing performed on the image IL1 for the left eye and the image IR1 for the right eye for stereoscopic viewing is as shown in FIGS. 10 to 12, using the IL1 for the left eye and the image IR1 for the right eye as original images. The stereoscopic image is created from the thus-generated image IL2 for the left eye and image IR2 for the right eye, after the corrections.

4. Reference Point Expansion Processing

In FIG. 13A, the quadrilateral area that is set by the reference points RP1 to RP4 is a trimmed area of the original image. The correction processing of this embodiment is done on the original image within this trimmed area. If the original image protrudes outside of this trimmed area, therefore, a problem arises in that the protruding portion of the original image is trimmed and thus lost.

Figure 7:
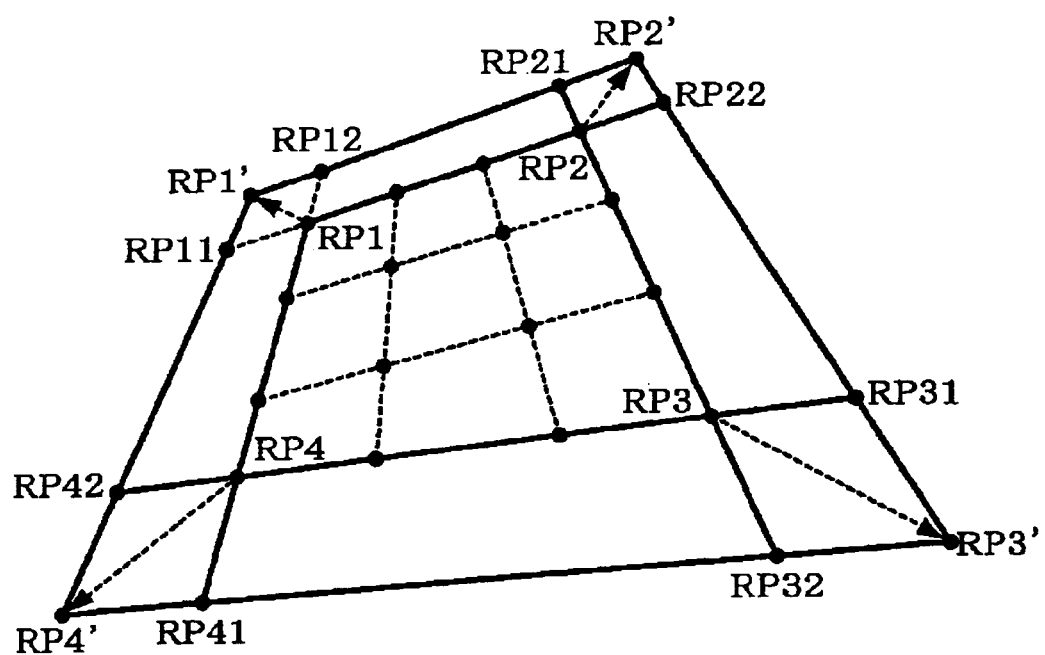
FIG. 7 is illustrative of expansion processing of reference points.

In such a case, this embodiment obtains new reference points RP1' to RP4' that are expansions outward from the reference points RP1 to RP4, as shown in FIG. 7. The system obtains division point coordinates based on the coordinates of the new reference points RP1' to RP4', and performs texture mapping by obtaining texture coordinates that are based on those division point coordinates, to implement the correction processing. Since this configuration ensures that these portions do not protrude from the trimmed area set by the new reference points RP1' to RP4', even if they do protrude outside of the original image in the trimmed area set by the pre-expansion the reference points RP1 to RP4, it makes it possible to implement suitable correction processing.

The processing for obtaining the coordinates of the new reference points RP1' to RP4' in this case can be implemented by extrapolation processing on the pre-expansion reference points RP1 to RP4. More specifically, the coordinates of extrapolated points RP11 and RP12 are obtained by extrapolation based on the previously described division length (division length in reciprocal representation), from the reference point RP1 of FIG. 7. Similarly, the coordinates of extrapolated points RP21, RP22, RP31, RP32, RP41, and RP42 are obtained by extrapolation based on the division lengths, from the reference points RP2, RP3, and RP4. The new reference points RP1' to RP4' are obtained from the intersections between a first straight line linking the extrapolated points RP11 and RP42, a second straight line linking the extrapolated points RP12 and RP21, a third straight line linking the extrapolated points RP22 and RP31, and a fourth straight line linking the extrapolated points RP32 and RP41. Images after suitable correction processing of the original image can be obtained by the processing described with reference to FIG. 10 to FIG. 15B, based on the coordinates of the thus-obtained reference points RP1' to RP4'.

5. Stereoscopic Viewing Method

Figure 16:
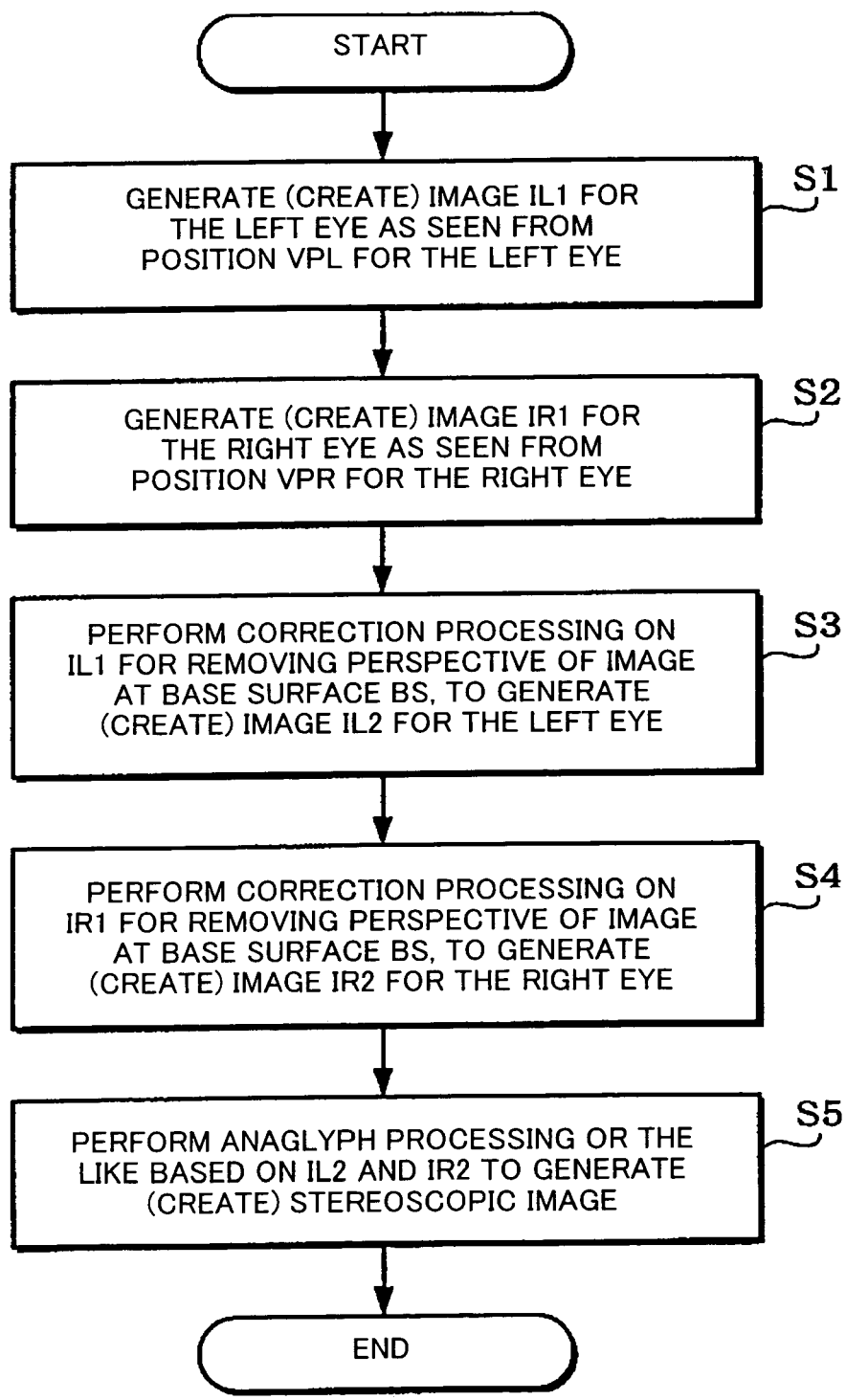
FIG. 16 is a flowchart of a stereoscopic viewing method in accordance with an embodiment of the present invention.

The description now turns to the stereoscopic viewing method of this embodiment. A flowchart of the stereoscopic viewing method in accordance with this embodiment is shown in FIG. 16.

First of all, the system generates (creates) a first image IL1 for the left eye and a first image IR1 for the right eye, for stereoscopic viewing (steps S1 and S2). More specifically, it generates (creates) the image IL1 for the left eye as seen from a viewpoint position VPL for the left eye and the image IR1 for the right eye as seen from a viewpoint position for the right eye VPR.

Figure 17:
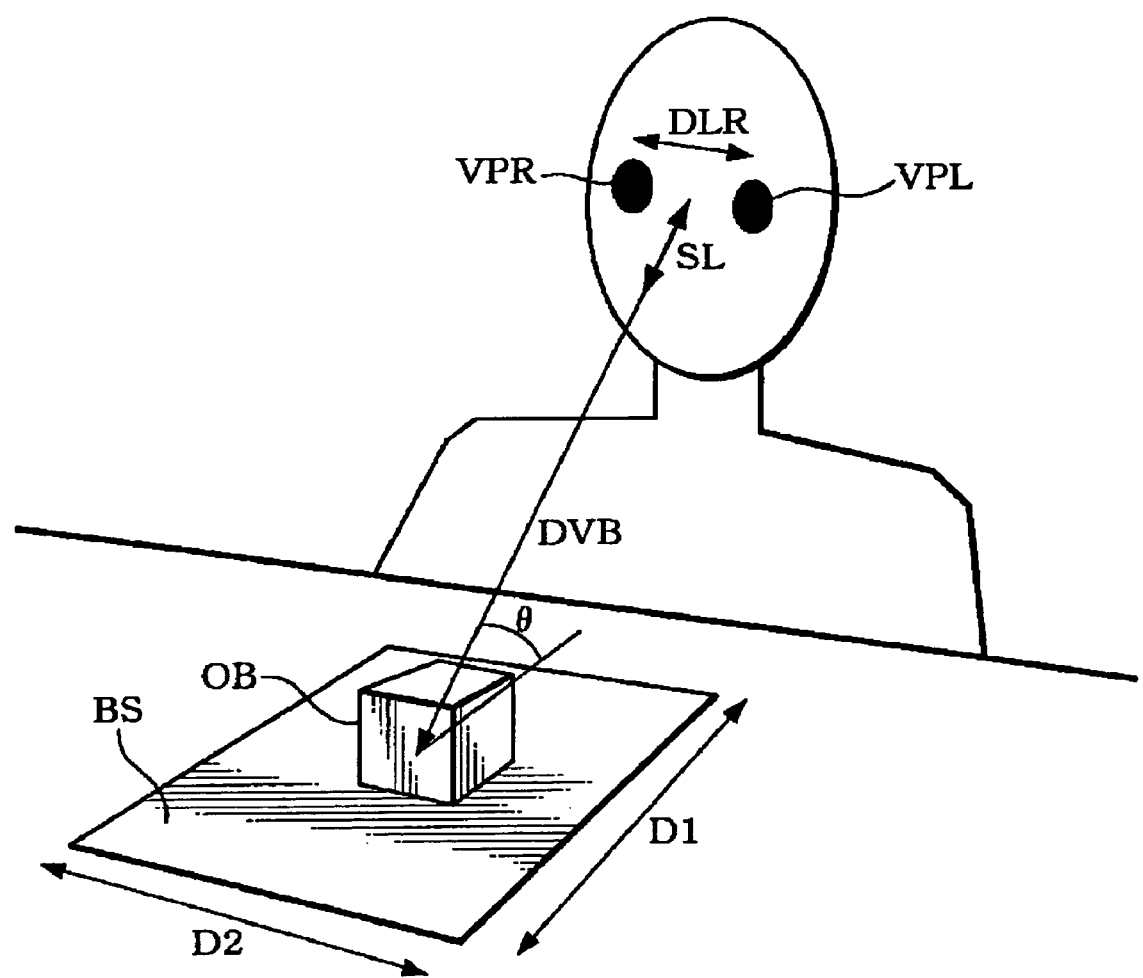
FIG. 17 is illustrative of the stereoscopic viewing method in accordance with an embodiment of the present invention.

In this case, the viewpoint positions for the left eye and the right eye VPL and VPR are positions at which the left eye and the right eye of a viewer are assumed to be, as shown in FIG. 17. If, for example, images IL1 and IR1 for the left eye and the right eye are created by photographing with a camera (digital camera), the camera is positioned at these VPL and VPR positions to capture the images IL1 and IR1 for the left eye and the right eye. In such a case, two cameras disposed at VPL and VPR could capture pictures simultaneously, or the position of one camera could be changed for the captures.

Alternatively, if the images IL1 and IR1 for the left eye and the right eye are generated by a system that generates computer graphics (CG) images and game images (real-time moving images), virtual cameras are disposed at these VPL and VPR positions to generate the images IL1 and IR1 for the left eye and the right eye. In other words, images are obtained as seen from VPL and VPR in the object space.

Figure 18:
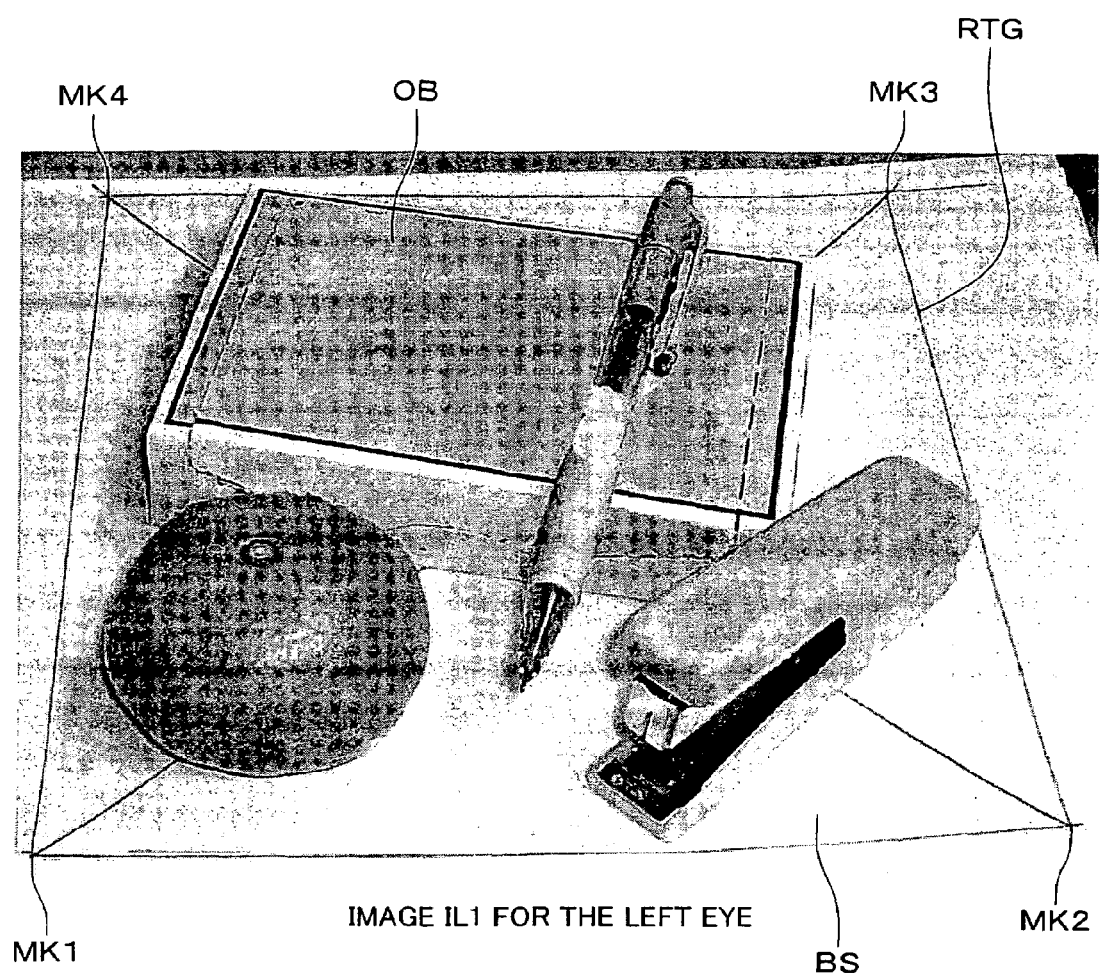
FIG. 18 shows an example of an image IL1 for the left eye.
Figure 19:
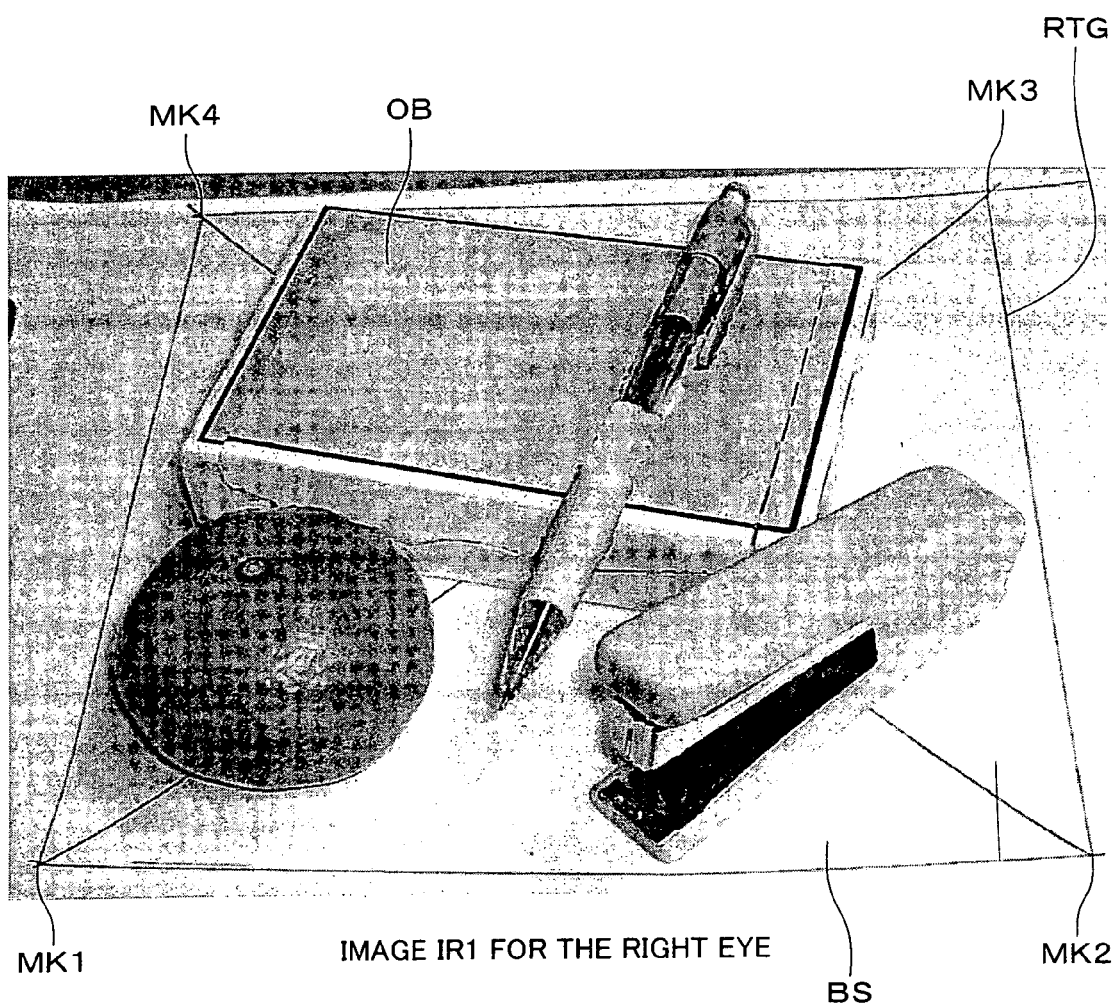
FIG. 19 shows an example of an image IR1 for the right eye.

Examples of the first image IL1 for the left eye and the first image IR1 for the right eye as shown in FIGS. 18 and 19. These are examples in which the images IL1 and IR1 have been created by photography with a camera (digital camera). Various objects such as a tangerine, a box, a ballpoint pen, and a stapler (generally speaking: subjects or objects, hereinafter the same) are disposed on a base surface (a mounting surface on which the objects are placed). The image IL1 for the left eye is obtained by disposing a camera at the viewpoint position VPL for the left eye and capturing the image by directing the line of sight (direction) of the camera toward the object (the main viewpoint, or a representative point of the object). Similarly, the image IR1 for the right eye is obtained by disposing the camera at the viewpoint position for the right eye VPR and directing the line of sight of the camera toward the object. As shown in FIGS. 18 and 19, there is an offset between the line-of-sight angles (viewing directions) of these images IL1 and IR1 for the left eye and the right eye, and a stereoscopic view is implemented by using the binocular parallax caused by that offset in the line-of-sight angles.

With CGs or a game, objects (such as objects that model a tangerine, a box, a ballpoint pen, and a stapler) are disposed on a base surface that has been set within an object space, and virtual cameras are positioned at VPL and VPR. Images similar to those of FIGS. 18 and 19 can be generated by directing the line-of-sight (direction) of each virtual camera towards the graphic objects (main viewpoint, or representative point of the graphic objects) then generating images as seen from the virtual cameras.

As shown in step S3 of FIG. 16, correction processing for removing the perspective of the image at a base surface BS is done on the first image IL1 for the left eye obtained by step S1, to generate (create) a second image IL2 for the left eye. Similarly, as shown at step S4, correction processing for removing the perspective of the image at the base surface BS is done on the first image IR1 for the right eye, to generate (create) a second image IR2 for the right eye. This correction processing is implemented by the processing described with reference to FIGS. 2A to 5 and 10 to 15B.

Figure 20:
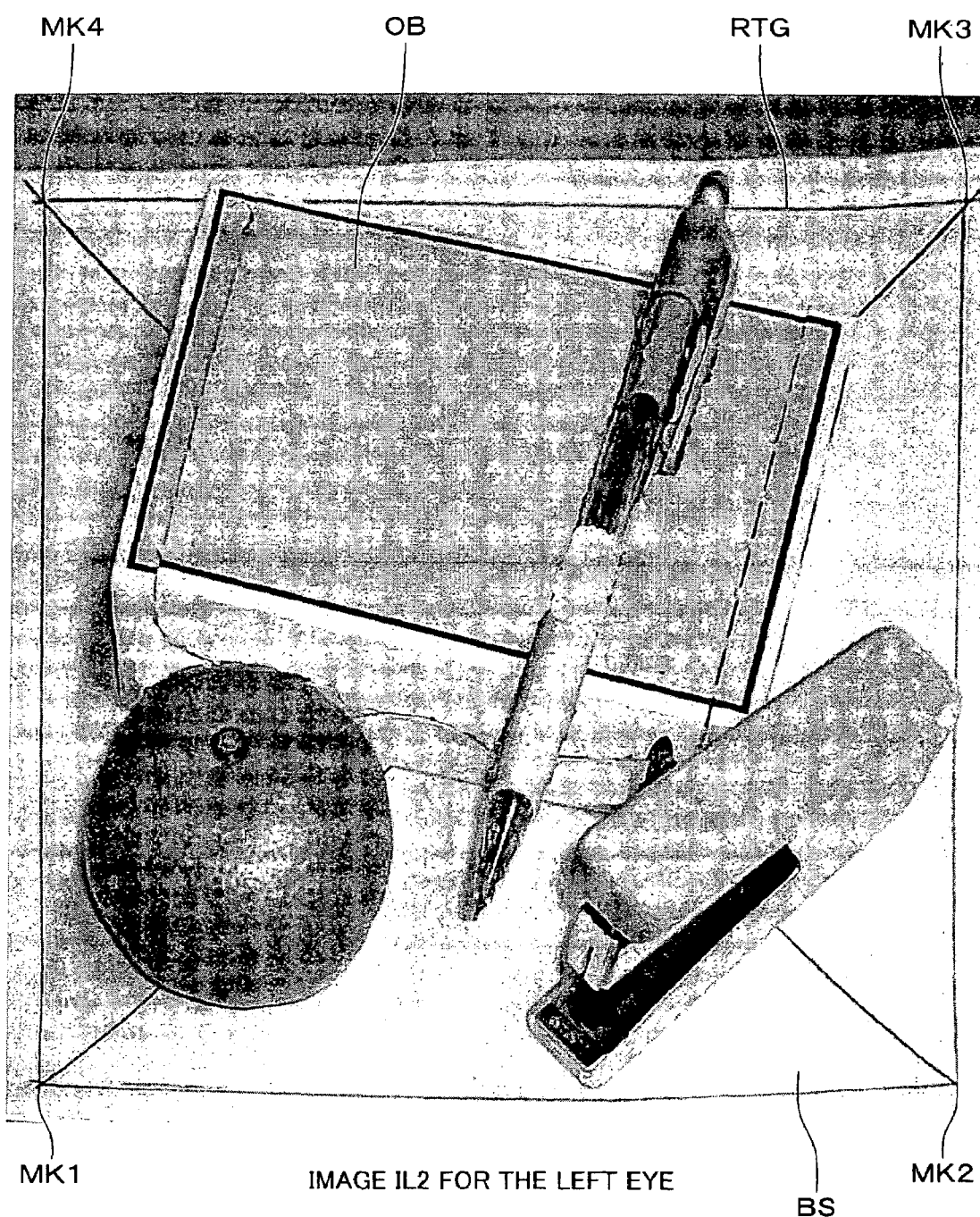
FIG. 20 shows an example of an image IL2 for the left eye.
Figure 21:
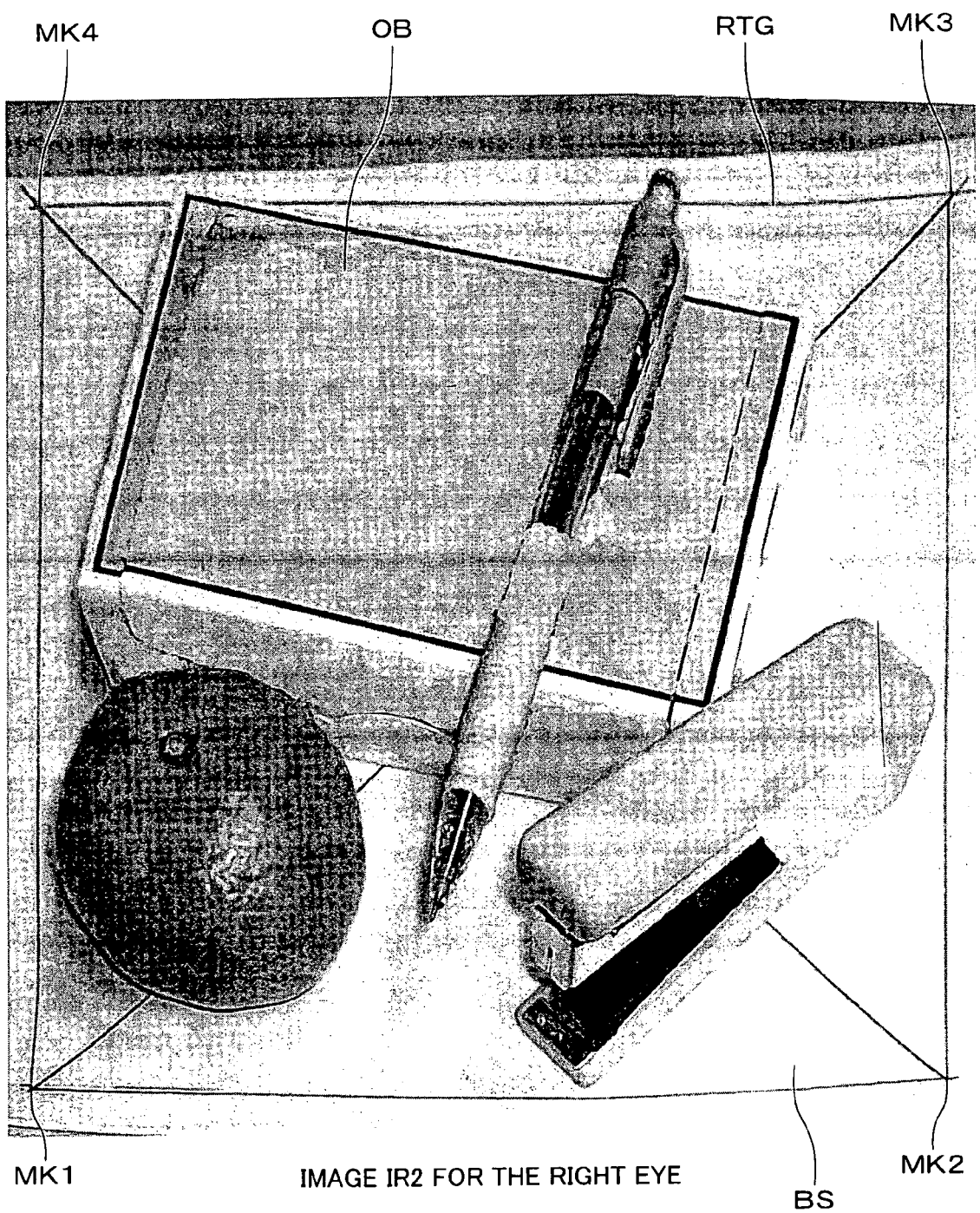
FIG. 21 shows an example of an image IR2 for the right eye.

Examples of the image IL2 for the left eye and the image IR2 for the right eye are shown in FIGS. 20 and 21. As shown by way of example in FIGS. 18 and 19, a rectangle RTG (where "rectangle" has a general meaning that also comprises "square", which is the same hereinafter) that is drawn on the base surface BS is also in perspective. In contrast thereto, the perspective of the rectangle RTG has been removed in FIGS. 20 and 21.

In this case, the correction processing for removing perspective is processing for removing perspective (depth perception) from an image of the base surface BS itself, an image IM1 drawn on the base surface, and an image of portions of an object OB (graphic object) that are in contact with the base surface BS. In other words, whereas the distance between vertices becomes smaller with distance from the viewpoint in B1 of FIG. 23A, the distance between the vertices does not change with distance from the viewpoint in B2 of FIG. 23A. The execution of such correction processing makes it possible to generate (create) an image as if seen from above, for the image of the base surface BS. Note that this correction processing needs not necessarily remove the perspective completely; it could equally well remove enough of the perspective to avoid incongruity in the stereoscopic view.

Note that in the image IL1 for the left eye and the image IR1 for the right eye (original images) of FIGS. 18 and 19, some of each image protrudes outward from the trimmed area set by MK1 to MK4 (reference points). In such a case, however, it is possible to avoid losing the portions that protrude from the trimmed area and perform the correction processing on those protruding portions as well, by performing the reference point expansion processing described with reference to FIG. 7, as shown in FIGS. 20 and 21.

As shown at step S5 of FIG. 16, a stereoscopic image (image data) is created (generated), based on the second image IL2 for the left eye and the second image IR2 for the right eye. More specifically, anaglyph processing or the like based on IL2 and IR2 is done to generate (create) a stereoscopic image.

Printed material for stereoscopic viewing can then be fabricated by using a color printer (generally speaking: a printing machine) that uses a method such as an ink-jet method or a laser printer method, to print this image for stereoscopic viewing (photographic image or CG image) onto a print medium. Note that the printed material for stereoscopic viewing could also be fabricated by making a master print by the color printer (print machine) then copying this printed material for stereoscopic viewing. This has the advantage of making it possible to fabricate large volumes of the printed material for stereoscopic viewing within a short period of time.

In addition, displaying the stereoscopic image on the display section of an image processing system makes it possible to generate game images (moving images) in real time. Note that in this case, stereoscopic images that have been obtained by anaglyph processing could be displayed directly on the display section and viewed by using spectacles (generally speaking: an appliance) that have been provided with color filters (red and blue). Alternatively, different frames of the images IL2 and IR2 for the left eye and the right eye, such as alternate frames, could be displayed on the display section and viewed by using spectacles that have been provided with liquid-crystal shutters or the like.

Figure 22:
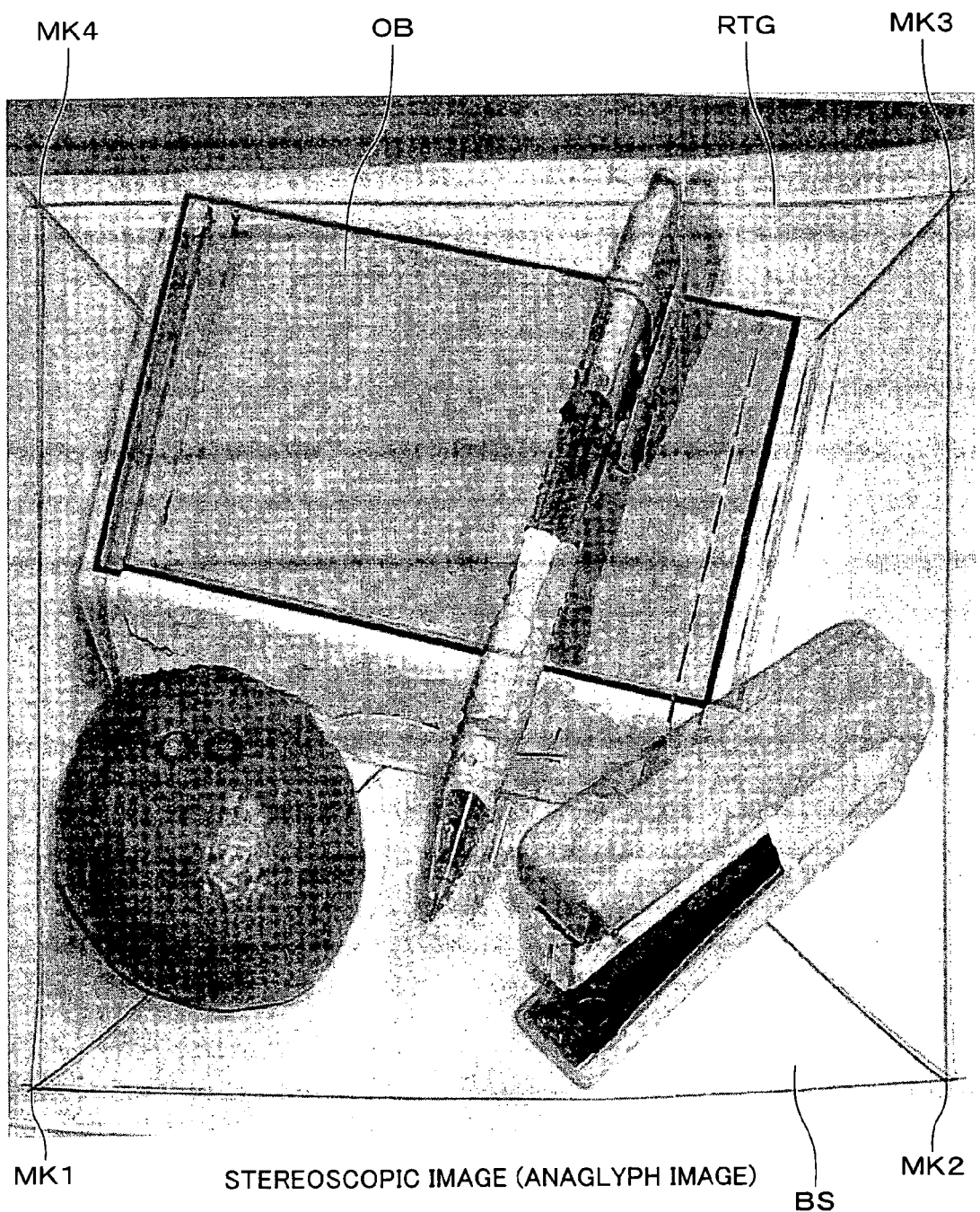
FIG. 22 shows an example of a stereoscopic image (an anaglyph image)

An example of a stereoscopic image obtained by anaglyph processing based on the images IL2 and IR2 for the left eye and the right eye of FIGS. 20 and 21 is shown in FIG. 22.

This image for stereoscopic viewing shown in FIG. 22 is a composite of the image IL2 for the left eye (IL) and the image IR2 for the right eye (IR). The image IL2 for the left eye and the image IR2 for the right eye each comprise an image of the object OB disposed on the base surface BS. An image of the base surface BS is also comprised therein.

Figure 24:
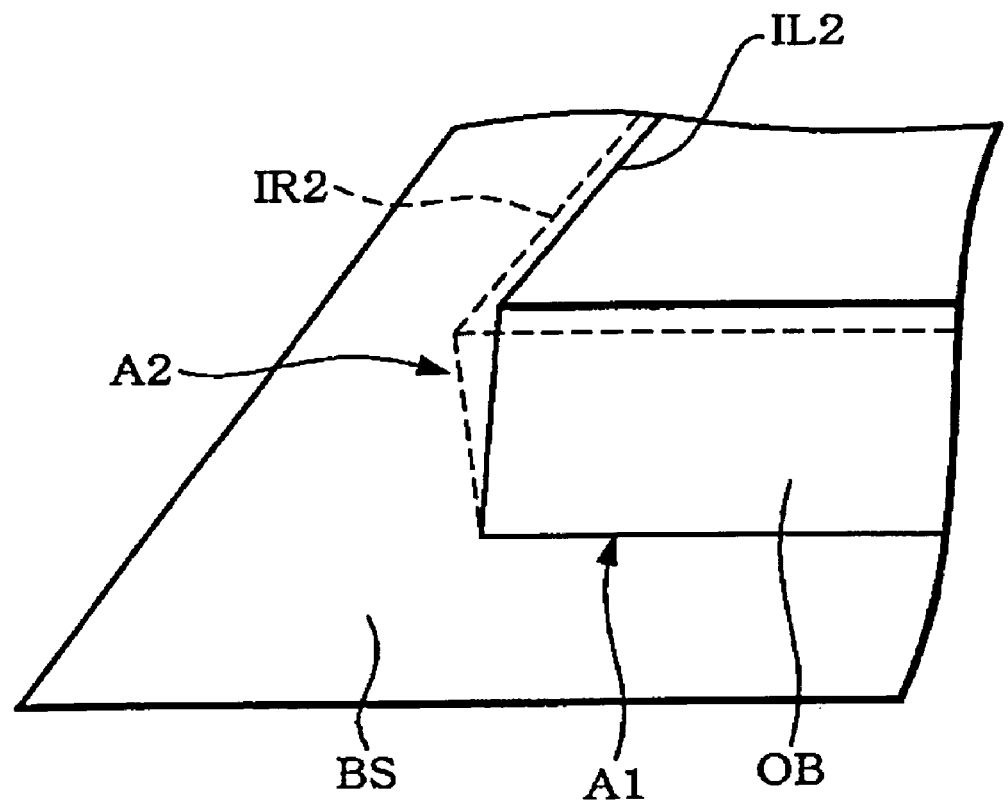
FIG. 24 is illustrative of the characteristics of a stereoscopic image that is obtained by an embodiment of the present invention.

As shown at A1 in FIG. 24, the object image of the image IL2 for the left eye and the object image of the image IR2 for the right eye match at the position of the base surface BS (note that it is not always necessary that they should match completely). In other words, the print position (display position) of the object image of the image IL2 for the left eye and the print position (display position) of the object image of the image IR2 for the right eye match at the base surface BS.

With increasing distance from the base surface BS, however, the offset between the object image of the image IL2 for the left eye and the object image for the image IR2 for the right eye grows larger, as shown at A2 in FIG. 24. More specifically, portions of the object OB that are positioned higher than the base surface BS have a larger offset between the print position (display position) for the image IL2 for the left eye and the print position (display position) for the image IR2 for the right eye.

Printed material for stereoscopic viewing can be fabricated by printing the stereoscopic images shown in FIGS. 22 and 24 on a print medium. A stereoscopic view can be implemented by viewing this printed material for stereoscopic viewing through spectacles provided with a red-color filter for the left eye and a blue-color filter for the right eye, by way of example. In addition, a game image for stereoscopic viewing can be generated by displaying the stereoscopic image of FIGS. 22 and 24 on a display section.

Figure 23A:
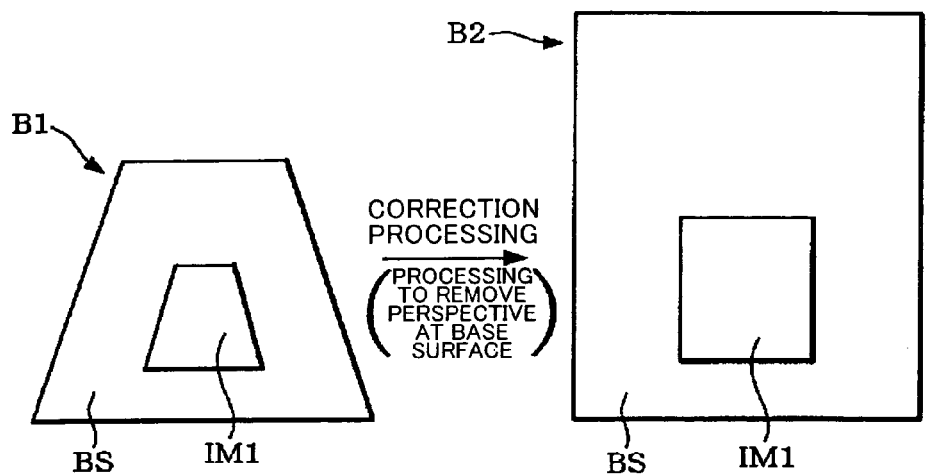
FIGS. 23A, 23B, and 23C are illustrative of correction processing to remove perspective.
Figure 23B:
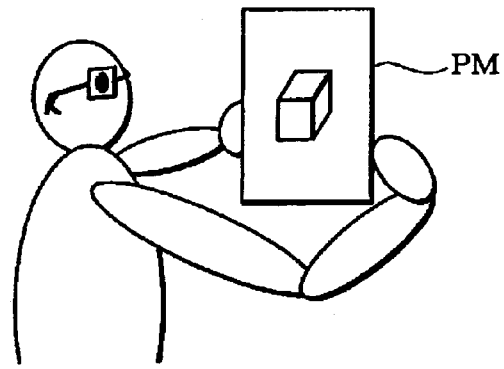

Up to this point, the printed material for stereoscopic viewing PM (or display screen of a display section, hereinafter the same) has been assumed to be disposed with the surface thereof parallel to a vertical surface, with the viewer looking at the printed material for stereoscopic viewing PM face-on, as shown in FIG. 23B. For that reason, images IL1 and IR1 for the left eye and the right eye such as those of FIGS. 18 and 19 are subjected to anaglyph processing without modification, to create the printed material for stereoscopic viewing PM. Since some perspective does remain in the images of FIGS. 18 and 19, the printed material for stereoscopic viewing PM shown in FIG. 23B will appear to be a correct image if viewed face-on, but only from the perspective perception point of view.

However, when the viewer looks at the printed material for stereoscopic viewing PM face-on, as shown in FIG. 23B, the focus (focal distance) ends up the same over the entire surface of the printed material for stereoscopic viewing PM. An inconsistency or error in the relationship between focal adjustment and binocular parallax or convergence will therefore be created in the human brain. The brain will therefore be forced to create stereoscopic linkages, which will seem unnatural and will make it impossible to recognize the stereoscopic effect. If the printed material for stereoscopic viewing PM created by the prior-art method is viewed while disposed on a desk that is parallel to the horizontal, there will be inconsistencies in the depth perception, giving an unnatural stereoscopic view. In other words, the rectangle RTG of FIGS. 18 and 19 is a plan view with a height of zero, so that the rectangle RTG cannot be viewed stereoscopically.

Figure 23C:
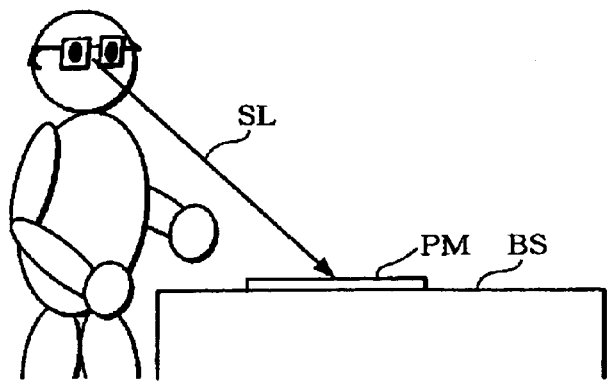

With this embodiment, it is assumed that the viewer looks at the printed material for stereoscopic viewing PM (display screen) while it is disposed on a desk (with the base surface BS parallel to a horizontal surface), as shown in FIG. 23C. In other words, this disposition is the default disposition of this method. When the printed material for stereoscopic viewing PM is to be disposed parallel to a horizontal surface in this manner, creating the printed material for stereoscopic viewing PM by subjecting the images of FIGS. 18 and 19 to anaglyph processing without modification will create inconsistencies in the perspective.

With this embodiment, correction processing is executed to remove the perspective of the image of the base surface, as described with reference to FIGS. 20, 21, and 23A. The anaglyph processing is then based on the images of FIGS. 20 and 21, after the removal of the perspective of the base surface, to create the printed material for stereoscopic viewing PM. If the thus created printed material for stereoscopic viewing PM is disposed parallel to a horizontal surface as shown in FIG. 23C, the image of the base surface (the rectangle RTG) will have a suitable perspective. If the printed material for stereoscopic viewing PM is disposed as shown in FIG. 23C the focal distance to each point of the surface thereof will not be the same, but will differ. For that reason, the focal adjustment will be similar to that in the real world. The offsets in the relationships between the focal adjustment and binocular parallax or convergence are also therefore reduced, making it possible to implement a more natural stereoscopic view that has a feeling of reality.

Figure 25:
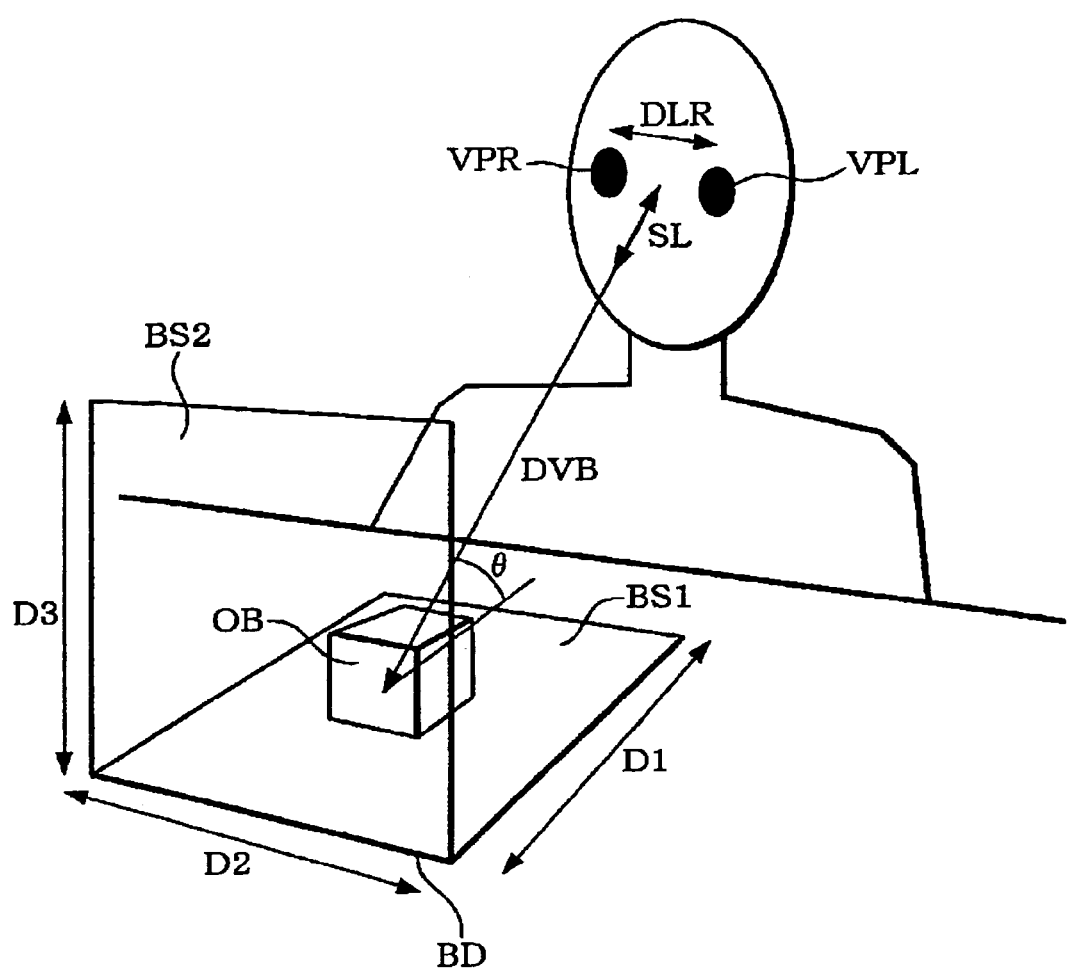
FIG. 25 is illustrative of a method of providing a plurality of base surfaces.

Note that there is a possibility that an offset in depth perception will occur in stereoscopic viewing method of this embodiment if the height of the object is too high. In such a case, two base surfaces BS1 and BS2 (generally speaking: a plurality of base surfaces) could be provided, as shown by way of example in FIG. 25.

In this case, the base surface BS1 is a surface that is parallel to a horizontal surface, by way of example. The base surface BS2, on the other hand, is a surface that subtends a predetermined angle (such as a right angle) with the base surface BS1. The base surfaces BS1 and BS2 are linked by a boundary BD.

The object OB (graphic object) is disposed on top of the base surface BSI and also on the nearer side of the base surface BS2 (the side with VPL and VPR). The processing is as shown in FIG. 26 instead of that of FIG. 16.

Figure 26:
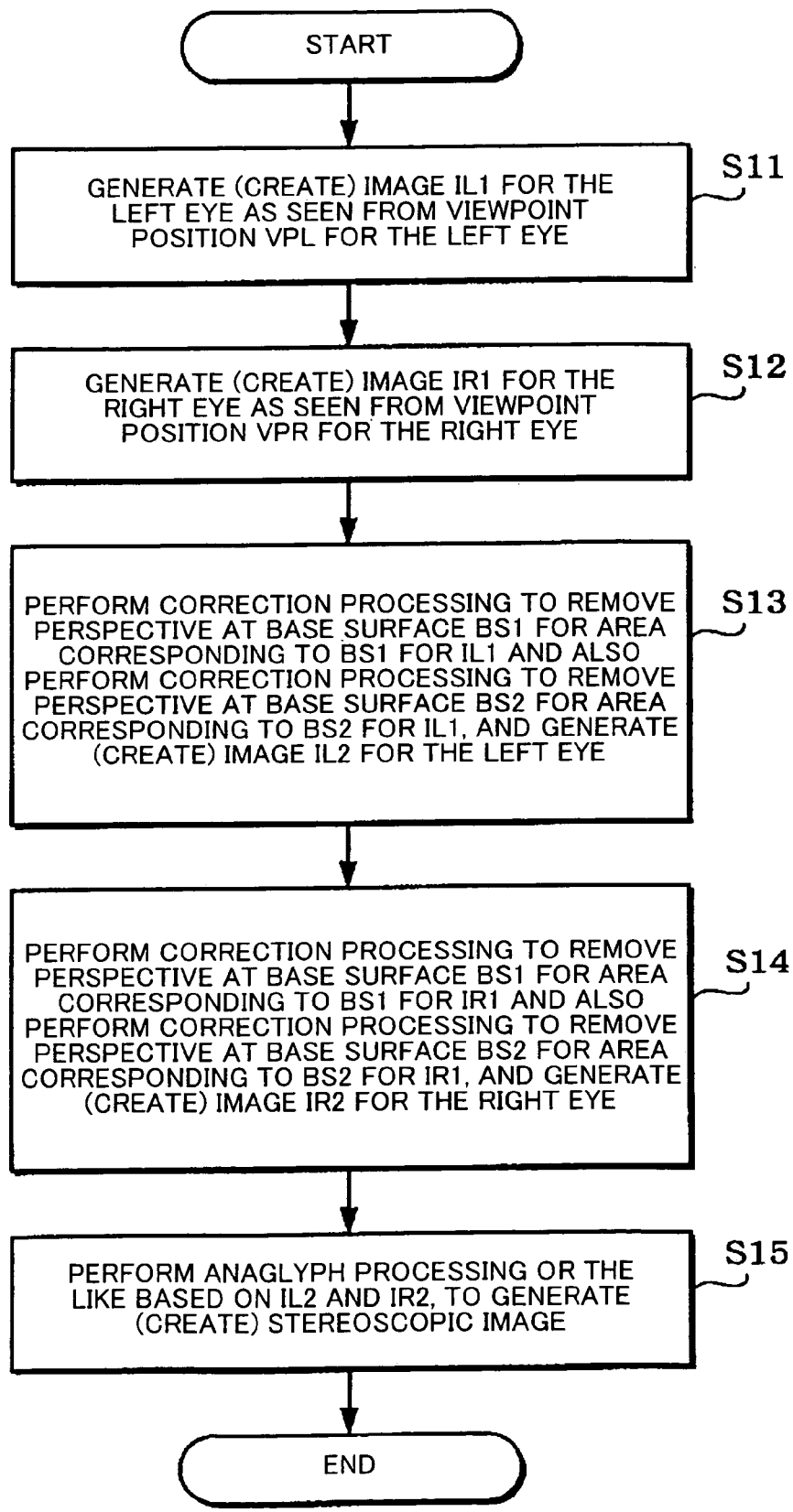
FIG. 26 is a flowchart of the method of providing a plurality of base surfaces.

Steps S11 and S12 of FIG. 26 are similar to steps S1 and S2 of FIG. 16. At step S13, correction processing to remove the perspective at the base surface BS1 is performed for an area corresponding to the base surface BS1 for the first image IL1 for the left eye (a first area of IL1 on the BS1 side with reference to the boundary BD). Correction processing is then performed for an area corresponding to the base surface BS2 for IL1 (a second area of IL1 on the BS2 side with reference to the boundary BD). The image IL2 for the left eye, which is an image linking the images generated by this correction processing, is then created (generated).

In step S14, correction processing to remove the perspective at the base surface BS1 is performed for an area corresponding to the base surface BS1 for the first image IR1 for the right eye (a first area of IR1 on the BS1 side with reference to the boundary BD). Correction processing is then performed for an area corresponding to the base surface BS2 for IR1 (a second area of IR1 on the BS2 side with reference to the boundary BD). The image IR2 for the right eye, which is an image linking the images generated by this correction processing, is then created (generated).

In the final step S15, processing such as anaglyph processing is used to generate (create) a stereoscopic image, based on IL2 and IR2. The thus-obtained image for stereoscopic viewing could be printed to produce printed material for stereoscopic viewing, or a game image that is a real-time moving image could be generated by displaying the stereoscopic image on a display section.

Figure 27:
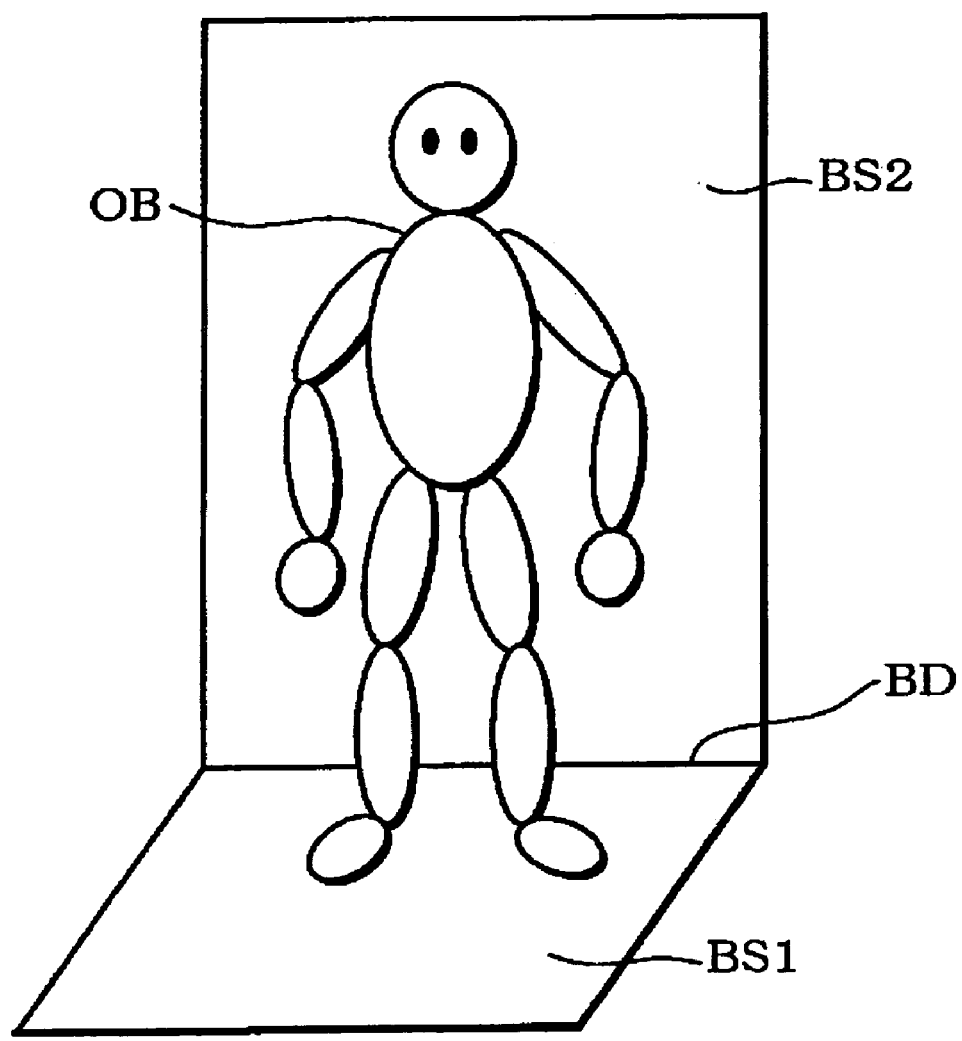
FIG. 27 is illustrative of a method of providing a plurality of base surfaces.

This process makes it possible to implement a more natural stereoscopic view that has a feeling of reality, even when OB is an object that stands some height above the base surface BS1, as shown in FIG. 27. In other words, it is possible to implement a stereoscopic view in an area in the vicinity of the feet of the object OB (the first area on the lower side of the boundary BS without any forced depth perception or focal adjustment, by processing using the base surface BS1. Similarly, it is possible to implement a stereoscopic view in the other areas (the second area on the upper side of the boundary BS) without any forced depth perception, by processing using the base surface BS2.

Note that the number of base surfaces is not limited to two, and thus three or more base surfaces (a plurality of linked base surfaces) could be used.

6. Anaglyph Processing

The anaglyph processing of step S5 of FIG. 16 and step S15 of FIG. 26 will now be described simply.

Anaglyph processing prints an image for the left eye and an image for the right eye in different colors on one sheet of print medium, to create a printed material for stereoscopic viewing. This printed material for stereoscopic viewing is viewed through color filters that differ for the left and right eyes (such as red for the left eye and blue for the right eye). During this time, the stereoscopic view is implemented by ensuring that the left eye can see only the image for the left eye and the right eye can see only the image for the right eye.

With monochrome anaglyph processing, for example, the image for the left eye (IL2 or IL) is converted to grayscale. The image data after the conversion is copied into the R-channel of the anaglyph image (RGB). The image for the right eye (IR2 or IR) is then converted to grayscale. The image data after the conversion is copied into the G-channel and the B-channel of the anaglyph image (RGB). This creates a monochrome anaglyph image. Note that the image for the right eye could equally well be copied into the B-channel alone.

With color anaglyph processing, the R-channel of the image for the left eye (IL2 or IL) is copied into the R-channel of the anaglyph image (RGB). Similarly, the G-channel of the image for the right eye (IR2 or IR) is copied into the G-channel of the anaglyph image (RGB). The B-channel of the image for the right eye is copied into the B-channel of the anaglyph image (RGB). This makes it possible to create a color (pseudo-color) anaglyph image.

Note that the method of implementing the stereoscopic view (step S5 of FIG. 16 or step S15 of FIG. 26) is not limited to anaglyph processing, providing at least an image for the left eye (IL2 or IL) and an image for the right eye (IR2 or IR) are used.

For instance, a special lens called a lenticular lens could be used to ensure that only the image for the left eye enters the left eye and only the image for the right eye enters the right eye, to implement the stereoscopic view.

It is also possible to dispose polarized plates in front of the image for the left eye and the image for the right eye, where the polarized plate placed before the image for the left eye has a different polarization direction than the polarized plate placed before the image for the right eye. The stereoscopic view could be implemented by the viewer wearing spectacles in which polarized plates having corresponding polarization directions are inserted into the lens portions thereof.

The image for the left eye and the image for the right eye could displayed alternately at each frame, by way of example. This stereoscopic view could be implemented by the viewer wearing spectacles in which a shutter (such as a liquid-crystal shutter) for the left eye opens in synchronization with the display of the image for the left eye and a shutter for the right eye opens in synchronization with the display of the image for the right eye.

Note that the present invention is not limited to this embodiment and thus various modifications thereto are possible within the scope of the invention laid out herein.

For example, terminology (such as: the divided image areas DR1 to DR4 and the polygons PL1 to PL4) that is derived from generic terminology defined within this document (such as: first to kth divided image areas and first to kth polygons) could be replaced by other terminology used within this document and figures in either a broad sense or specifically.

It is also possible for an aspect of the present invention that is defined by a dependent claim to omit some of the configurational requirements of the corresponding antecedent claim. Similarly, the components of the present invention defined by an independent claim can also be allocated to other independent claims.

The methods of generating the image for the left eye, the image for the right eye, and the stereoscopic image are also not limited to those described with relation to this embodiment, and thus various different embodiments are possible.

Stereoscopic images generated by the method of the present invention can be used in applications other than printed material for stereoscopic viewing or game images.

Images generated by the correction processing of the present invention can also be used in applications other than the generation of stereoscopic images.

What is claimed is:

1. An image processing system for performing correction processing on an original image, the image processing system comprising:
   a texture coordinates calculation section which divides an area of the original image into first to kth divided image areas (K is an integer greater than or equal to 2) in a mesh form, and obtains texture coordinates specified by coordinates of division points of the first to kth divided image areas; and
   a texture mapping section which maps images of the first to kth divided image areas onto first to kth polygons based on the obtained texture coordinates, the first to Kth polygons being disposed in a mesh form in a one-to-one relationship with the first to kth divided image areas, wherein the texture coordinates calculation section obtains texture coordinates by dividing the area of the original image into the first to kth divided image areas in such a manner that division spacing in a direction from the original image toward a vanishing point of perspective of the original image becomes narrower as the divided image areas are closer to the vanishing point.

2. The image processing system as defined in claim 1, wherein the texture coordinates calculation section:

obtains coordinates of a first vanishing point which is an intersection between a line extending from a fourth edge of a quadrilateral of which vertices are first to fourth reference points that are set within the area of the original image, and a line extending from a second edge of the quadrilateral which is opposite to the fourth edge;

obtains coordinates of the first reference point and coordinates of the fourth reference point in an X-Y coordinate system having the first vanishing point as the origin;

performs linear interpolation between reciprocals of coordinate values of the first reference point and reciprocals of coordinate values of the fourth reference point, and obtains coordinates of division points on the fourth edge which links the first and fourth reference points, based on reciprocals of values obtained by the linear interpolation;

obtains coordinates of the second reference point and coordinates of the third reference point in the X-Y coordinate system having the first vanishing point as the origin;

performs linear interpolation between reciprocals of coordinate values of the second reference point and reciprocals of coordinate values of the third reference point, and obtains coordinates of division points on the second edge which links the second and third reference points, based on reciprocals of values obtained by the linear interpolation; and obtains coordinates of division points on edges linking the division points on the fourth and second edges, based on the coordinates of the division points on the fourth edge and the coordinates of the division points on the second edge.

3. The image processing system as defined in claim 2, wherein the texture coordinates calculation section further:

obtains coordinates of new first to fourth reference points by extrapolation processing on the first to fourth reference points, and obtains coordinates of division points based on the obtained coordinates of the new first to fourth reference points.

4. The image processing system as defined in claim 1 further comprising:

a fetch section which fetches a first image for the left eye and a first image for the right eye for stereoscopic viewing; and a stereoscopic image generation section which generates a stereoscopic image, wherein the texture coordinates calculation section:

obtains texture coordinates by dividing an area of the first image for the left eye into first to kth divided image areas for the left eye in such a manner that division spacing in the direction from the first image for the left eye to a vanishing point of perspective of the first image for the left eye becomes narrower as the divided image areas are closer to the vanishing point; and obtains texture coordinates by dividing an area of the first image for the right eye into first to kth divided image areas for the right eye in such a manner that division spacing in the direction from the first image for the right eye to a vanishing point of perspective of the first image for the right eye becomes narrower as the divided image areas are closer to the vanishing point, wherein the texture mapping section:

maps images for the first to kth divided image areas for the left eye onto first to kth polygons which are disposed in a mesh form in a one-to-one relationship with the first to kth divided image areas for the left eye, to generate a second image for the left eye which has been subjected to correction processing to remove perspective; and maps images for the first to kth divided image areas for the right eye onto first to kth polygons which are disposed in a mesh form in a one-to-one relationship with the first to kth divided image areas for the right eye, to generate a second image for the right eye which has been subjected to correction processing to remove perspective, and wherein the stereoscopic image generation section generates a stereoscopic image, based on the second image for the left eye and the second image for the right eye.

5. The image processing system as defined in claim 2, a fetch section which fetches a first image for the left eye and a first image for the right eye for stereoscopic viewing; and a stereoscopic image generation section which generates a stereoscopic image, wherein the texture coordinates calculation section:

obtains texture coordinates by dividing an area of the first image for the left eye into first to kth divided image areas for the left eye in such a manner that division spacing in the direction from the first image for the left eye to a vanishing point of perspective of the first image for the left eye becomes narrower as the divided image areas are closer to the vanishing point; and obtains texture coordinates by dividing an area of the first image for the right eye into first to kth divided image areas for the right eye in such a manner that division spacing in the direction from the first image for the right eye to a vanishing point of perspective of the first image for the right eye becomes narrower as the divided image areas are closer to the vanishing point, wherein the texture mapping section:

maps images for the first to kth divided image areas for the left eye onto first to kth polygons which are disposed in a mesh form in a one-to-one relationship with the first to kth divided image areas for the left eye, to generate a second image for the left eye which has been subjected to correction processing to remove perspective; and maps images for the first to kth divided image areas for the right eye onto first to kth polygons which are disposed in a mesh form in a one-to-one relationship with the first to kth divided image areas for the right eye, to generate a second image for the right eye which has been subjected to correction processing to remove perspective, and wherein the stereoscopic image generation section generates a stereoscopic image, based on the second image for the left eye and the second image for the right eye.

6. The image processing system as defined in claim 4, wherein a stereoscopic image is generated by using anaglyph processing to synthesize the second image for the left eye and the second image for the right eye.

7. The image processing system as defined in claim 5, wherein a stereoscopic image is generated by using anaglyph processing to synthesize the second image for the left eye and the second image for the right eye.

8. A computer-readable information storage medium storing a program for image processing, the program causing a computer to implement processing of:
dividing an area of the original image into first to kth divided image areas (K is an integer greater than or equal to 2) in a mesh form, and obtaining texture coordinates specified by coordinates of division points of the first to kth divided image areas;
mapping images of the first to kth divided image areas onto first to kth polygons based on the obtained texture coordinates, the first to Kth polygons being disposed in a mesh form in a one-to-one relationship with the first to kth divided image areas; and
obtaining texture coordinates by dividing the area of the original image into the first to kth divided image areas in such a manner that division spacing in a direction from the original image toward a vanishing point of perspective of the original image becomes narrower as the divided image areas are closer to the vanishing point.

9. The computer-readable information storage medium as defined in claim 8, the program further causing a computer to implement processing of:
obtaining coordinates of a first vanishing point which is an intersection between a line extending from a fourth edge of a quadrilateral of which vertices are first to fourth reference points that are set within the area of the original image, and a line extending from a second edge of the quadrilateral which is opposite to the fourth edge;
obtaining coordinates of the first reference point and coordinates of the fourth reference point in an X-Y coordinate system having the first vanishing point as the origin;
performing linear interpolation between reciprocals of coordinate values of the first reference point and reciprocals of coordinate values of the fourth reference point, and obtaining coordinates of division points on the fourth edge which links the first and fourth reference points, based on reciprocals of values obtained by the linear interpolation;
obtaining coordinates of the second reference point and coordinates of the third reference point in the X-Y coordinate system having the first vanishing point as the origin;
performing linear interpolation between reciprocals of coordinate values of the second reference point and reciprocals of coordinate values of the third reference point, and obtaining coordinates of division points on the second edge which links the second and third reference points, based on reciprocals of values obtained by the linear interpolation; and
obtaining coordinates of division points on edges linking the division points on the fourth and second edges, based on the coordinates of the division points on the fourth edge and the coordinates of the division points on the second edge.

10. The computer-readable information storage medium as defined in claim 9, the program further causing a computer to implement processing of:
obtaining coordinates of new first to fourth reference points by extrapolation processing on the first to fourth reference points, and obtains coordinates of division points based on the obtained coordinates of the new first to fourth reference points.

11. The computer-readable information storage medium as defined in claim 8, the program further causing a computer to implement processing of:
fetching a first image for the left eye and a first image for the right eye for stereoscopic viewing;
obtaining texture coordinates by dividing an area of the first image for the left eye into first to kth divided image areas for the left eye in such a manner that division spacing in the direction from the first image for the left eye to a vanishing point of perspective of the first image for the left eye becomes narrower as the divided image areas are closer to the vanishing point;
obtaining texture coordinates by dividing an area of the first image for the right eye into first to kth divided image areas for the right eye in such a manner that division spacing in the direction from the first image for the right eye to a vanishing point of perspective of the first image for the right eye becomes narrower as the divided image areas are closer to the vanishing point;
mapping images for the first to kth divided image areas for the left eye onto first to kth polygons which are disposed in a mesh form in a one-to-one relationship with the first to kth divided image areas for the left eye, to generate a second image for the left eye which has been subjected to correction processing to remove perspective; and
mapping images for the first to kth divided image areas for the right eye onto first to kth polygons which are disposed in a mesh form in a one-to-one relationship with the first to kth divided image areas for the right eye, to generate a second image for the right eye which has been subjected to correction processing to remove perspective; and
generating a stereoscopic image, based on the second image for the left eye and the second image for the right eye.

12. The computer-readable information storage medium as defined in claim 9, the program further causing a computer to implement processing of:
fetching a first image for the left eye and a first image for the right eye for stereoscopic viewing;
obtaining texture coordinates by dividing an area of the first image for the left eye into first to kth divided image areas for the left eye in such a manner that division spacing in the direction from the first image for the left eye to a vanishing point of perspective of the first image for the left eye becomes narrower as the divided image areas are closer to the vanishing point;
obtaining texture coordinates by dividing an area of the first image for the right eye into first to kth divided image areas for the right eye in such a manner that division spacing in the direction from the first image for the right eye to a vanishing point of perspective of the first image for the right eye becomes narrower as the divided image areas are closer to the vanishing point;
mapping images for the first to kth divided image areas for the left eye onto first to kth polygons which are disposed in a mesh form in a one-to-one relationship with the first to kth divided image areas for the left eye, to generate a second image for the left eye which has been subjected to correction processing to remove perspective; and mapping images for the first to kth divided image areas for the right eye onto first to kth polygons which are disposed in a mesh form in a one-to-one relationship with the first to kth divided image areas for the right eye, to generate a second image for the right eye which has been subjected to correction processing to remove perspective; and generating a stereoscopic image, based on the second image for the left eye and the second image for the right eye.

13. The computer-readable information storage medium as defined in claim 11, the program further causing a computer to implement processing of:

generating a stereoscopic image by using anaglyph processing to synthesize the second image for the left eye and the second image for the right eye.

14. The computer-readable information storage medium as defined in claim 12, the program further causing a computer to implement processing of:

generating a stereoscopic image by using anaglyph processing to synthesize the second image for the left eye and the second image for the right eye.

15. A method for image processing comprising:

dividing an area of the original image into first to kth divided image areas (K is an integer greater than or equal to 2) in a mesh form, and obtaining texture coordinates specified by coordinates of division points of the first to kth divided image areas;

mapping images of the first to kth divided image areas onto first to kth polygons based on the obtained texture coordinates, the first to Kth polygons being disposed in a mesh form in a one-to-one relationship with the first to kth divided image areas; and obtaining texture coordinates by dividing the area of the original image into the first to kth divided image areas in such a manner that division spacing in a direction from the original image toward a vanishing point of perspective of the original image becomes narrower as the divided image areas are closer to the vanishing point.

16. The method as defined in claim 15, obtaining coordinates of a first vanishing point which is an intersection between a line extending from a fourth edge of a quadrilateral of which vertices are first to fourth reference points that are set within the area of the original image, and a line extending from a second edge of the quadrilateral which is opposite to the fourth edge;

obtaining coordinates of the first reference point and coordinates of the fourth reference point in an X-Y coordinate system having the first vanishing point as the origin;

performing linear interpolation between reciprocals of coordinate values of the first reference point and reciprocals of coordinate values of the fourth reference point, and obtaining coordinates of division points on the fourth edge which links the first and fourth reference points, based on reciprocals of values obtained by the linear interpolation;

obtaining coordinates of the second reference point and coordinates of the third reference point in the X-Y coordinate system having the first vanishing point as the origin;

performing linear interpolation between reciprocals of coordinate values of the second reference point and reciprocals of coordinate values of the third reference point, and obtaining coordinates of division points on the second edge which links the second and third reference points, based on reciprocals of values obtained by the linear interpolation; and obtaining coordinates of division points on edges linking the division points on the fourth and second edges, based on the coordinates of the division points on the fourth edge and the coordinates of the division points on the second edge.

17. The method as defined in claim 15, fetching a first image for the left eye and a first image for the right eye for stereoscopic viewing;

obtaining texture coordinates by dividing an area of the first image for the left eye into first to kth divided image areas for the left eye in such a manner that division spacing in the direction from the first image for the left eye to a vanishing point of perspective of the first image for the left eye becomes narrower as the divided image areas are closer to the vanishing point;

obtaining texture coordinates by dividing an area of the first image for the right eye into first to kth divided image areas for the right eye in such a manner that division spacing in the direction from the first image for the right eye to a vanishing point of perspective of the first image for the right eye becomes narrower as the divided image areas are closer to the vanishing point;

mapping images for the first to kth divided image areas for the left eye onto first to kth polygons which are disposed in a mesh form in a one-to-one relationship with the first to kth divided image areas for the left eye, to generate a second image for the left eye which has been subjected to correction processing to remove perspective; and mapping images for the first to kth divided image areas for the right eye onto first to kth polygons which are disposed in a mesh form in a one-to-one relationship with the first to kth divided image areas for the right eye, to generate a second image for the right eye which has been subjected to correction processing to remove perspective; and generating a stereoscopic image, based on the second image for the left eye and the second image for the right eye.

* * * * *